(12) United States Patent
Sun

(10) Patent No.: US 12,477,420 B2
(45) Date of Patent: Nov. 18, 2025

(54) METHOD, APPARATUS, AND SYSTEM, AND COMPUTER-READABLE STORAGE MEDIUM FOR MEASURING, IDENTIFYING, AND OBTAINING CONTROL RIGHTS FOR REFLECTORS BELONGING TO A BASE STATION

(71) Applicant: Huawei Technologies Co., Ltd., Shenzhen (CN)

(72) Inventor: Huan Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 462 days.

(21) Appl. No.: 18/147,245

(22) Filed: Dec. 28, 2022

(65) Prior Publication Data

US 2023/0134172 A1 May 4, 2023

Related U.S. Application Data

(63) Continuation of application No. PCT/CN2021/100367, filed on Jun. 16, 2021.

(30) Foreign Application Priority Data

Jun. 29, 2020 (CN) .................. 202010604945.X

(51) Int. Cl.
*H04W 36/06* (2009.01)
*H04W 52/24* (2009.01)

(52) U.S. Cl.
CPC ......... *H04W 36/06* (2013.01); *H04W 52/241* (2013.01)

(58) Field of Classification Search
CPC ... H04W 36/06; H04W 52/241; H04W 36/08; H04W 84/047; H04W 40/22; H04B 7/04013; H04B 7/15528; H04B 7/15507; H04B 7/026; H04B 7/145; H04L 5/0035; H04L 5/0091
See application file for complete search history.

(56) References Cited

U.S. PATENT DOCUMENTS

2004/0223139 A1* 11/2004 Vogel ................. G01S 5/163
356/140
2011/0244786 A1* 10/2011 Fujii .................. H01Q 19/104
455/7
2021/0297143 A1* 9/2021 Hsin .................. H04L 43/0894

* cited by examiner

*Primary Examiner* — Afshawn M Towfighi
(74) *Attorney, Agent, or Firm* — Slater Matsil, LLP

(57) ABSTRACT

Embodiments discloses a communication method, apparatus, and system, and a computer-readable storage medium. The method includes: A first base station sends a coordination request to a second base station, the second base station being a base station other than the first base station; the first base station receives a coordination response, the coordination response including identifiers of M first reflectors, M is an integer greater than 0, the M first reflectors belong to the second base station, the coordination response is sent by the second base station after releasing a control right on the M first reflectors based on the coordination request, the M first reflectors can cover first UE, and the first UE is homed to the first base station; the first base station obtains the control right on the M first reflectors; and the first base station communicates with the first UE by using the M first reflectors.

20 Claims, 10 Drawing Sheets

METHOD, APPARATUS, AND SYSTEM, AND COMPUTER-READABLE STORAGE MEDIUM FOR MEASURING, IDENTIFYING, AND OBTAINING CONTROL RIGHTS FOR REFLECTORS BELONGING TO A BASE STATION

CROSS-REFERENCE TO RELATED APPLICATIONS

This application is a continuation of International Application No. PCT/CN2021/100367, filed on Jun. 16, 2021, which claims priority to Chinese Patent Application No. 202010604945.X, filed on Jun. 29, 2020. The disclosures of the aforementioned applications are hereby incorporated by reference in their entireties.

TECHNICAL FIELD

This application relates to the communications field, and in particular, to a communication method, apparatus, and system, and a computer-readable storage medium.

BACKGROUND

In the field of mobile communications, a base station is responsible for data sending and receiving of served user equipment within a specific area, where the area is a coverage area of the base station. At present, usually, coverage areas of a plurality of base stations may overlap. In this case, for some user equipments, the user equipment may be located in an overlapping area between the coverage areas of the plurality of base stations.

For ease of description, the user equipment located in the overlapping area is referred to as first user equipment. Currently, a communication capability of the first user equipment may be improved in the following three manners. The three manners are as follows:

In a first manner, a home base station of the first user equipment sends data to the first user equipment, and a neighboring base station of the home base station also sends data belonging to the first user equipment. In this way, signal strength received by the first user equipment can be increased, so as to improve the communication capability of the first user equipment.

In a second manner, a home base station requests a neighboring base station to stop using a time-frequency resource occupied by the first user equipment, so that the neighboring base station stops sending, on the time-frequency resource, data to second user equipment homed to the neighboring base station. This reduces interference from the neighboring base station to the first user equipment, so as to improve the communication capability of the first user equipment.

In a third manner, a home base station requests a neighboring base station to change a transmission direction to stop sending data belonging to second user equipment to the first user equipment. In this way, interference from the neighboring base station to the first user equipment can be reduced, so as to improve the communication capability of the first user equipment.

In a process of implementing this application, the inventor finds that a conventional technology has at least the following problems:

In the foregoing first manner, the neighboring base station uses a resource to send the data to the first user equipment, in which case the neighboring base station reduces a quantity of resources allocated to the second user equipment. As a result, a communication capability of the second user equipment is affected.

In the foregoing second manner or third manner, as the neighboring base station stops using the time-frequency resource occupied by the first user equipment or changes the transmission direction, the communication capability of the second user equipment is also affected.

SUMMARY

This application provides a communication method, apparatus, and system, and a computer-readable storage medium, so as to avoid affecting a communication capability of a user in a neighboring cell. Technical solutions are as follows:

According to a first aspect, this application provides a communication method. In the method, a first base station sends a coordination request to a second base station. The second base station is a base station other than the first base station. The first base station receives a coordination response. The coordination response includes identifiers of M first reflectors, where M is an integer greater than 0. The M first reflectors belong to the second base station. The coordination response is sent by the second base station after releasing a control right on the M first reflectors based on the coordination request. The M first reflectors can cover first user equipment UE. The first UE is homed to the first base station. The first base station obtains the control right on the M first reflectors, and communicates with the first UE by using the M first reflectors.

Because the first base station merely obtains the control right on the M first reflectors from the second base station and communicates with the first UE by using the M first reflectors, in a communication process, the first base station does not use a resource in the second base station, and the second base station does not need to stop using a time-frequency resource occupied by the first UE and does not need to change a transmission direction. Therefore, communication between the second base station and second UE homed to the second base station is not affected, so that a communication capability of the second UE is not affected. This avoids affecting a communication capability of a user in a neighboring cell. In addition, after the first base station obtains the control right on the M first reflectors, the first base station and the second base station do not need to exchange data such as control signaling before the first base station communicates with the first UE, that is, the first base station and the first UE can directly communicate with each other. In this way, a communication delay is reduced, and a communication capability of the first UE is improved.

In a possible implementation, the coordination request includes identifiers of N first reflectors that can cover the first UE. The N first reflectors belong to the second base station. The coordination request is used by the second base station to determine, from the first reflectors corresponding to the identifiers of the N first reflectors, the M first reflectors for which the control right can be released. N is an integer greater than or equal to M. In this way, the second base station can select, within a specified range, the first reflector for which the control right can be released.

In another possible implementation, the coordination request includes location description information of the first UE, and the coordination request is used by the second base station to determine, based on the location description information, the M first reflectors for which the control right can be released. In this way, the second base station can autonomously determine the first reflector for which the control right can be released.

In another possible implementation, when the coordination request includes the identifiers of the N first reflectors, the first base station determines the N first reflectors that can cover the first UE. Because the determined N first reflectors can cover the first UE, and the M first reflectors are selected from the N first reflectors, it is ensured that the first base station can communicate with the first UE by using the M first reflectors.

In another possible implementation, the first base station receives the identifiers of the N first reflectors sent by the first UE, where the N first reflectors are obtained by the first UE by measuring a signal reflected by a reflector belonging to the second base station. Because the N first reflectors are obtained by the first UE through measurement and the M first reflectors are selected from the N first reflectors, it is ensured that the first base station can communicate with the first UE by using the M first reflectors.

In another possible implementation, the first base station determines, based on the location description information of the first UE, a neighboring cell that can cover the first UE. The first base station selects, based on the location description information of the first UE, the N first reflectors from reflectors belonging to the neighboring cell. In this way, as the N first reflectors are selected based on the location description information of the first UE, it is ensured that the N first reflectors can cover the first UE.

In another possible implementation, the first base station measures channel quality information of an uplink equivalent channel between the first base station and the first UE. The uplink equivalent channel includes M cascaded channels, where each cascaded channel includes a channel from the first UE to one first reflector and a channel from the one first reflector to the first base station. The one first reflector is one of the M first reflectors. The first base station determines a power adjustment parameter of the first UE based on the channel quality information of the uplink equivalent channel, and sends the power adjustment parameter to the first UE. In this way, the first UE can adjust transmit power of the first UE based on the power adjustment parameter, thereby ensuring that the first UE can communicate with the first base station.

In another possible implementation, the first base station measures delay information of the uplink equivalent channel between the first base station and the first UE. The uplink equivalent channel includes the M cascaded channels, where each cascaded channel includes a channel from the first UE to one first reflector and a channel from the one first reflector to the first base station. The one first reflector is one of the M first reflectors. The first base station sends cyclic prefix CP length indication information to the first UE based on the delay information, so that the first UE can adjust a CP length of the first UE based on the CP length indication information, thereby ensuring that the first UE can communicate with the first base station.

In another possible implementation, the first base station separately activates each of at least one second reflector in a timeslot corresponding to the second reflector, and separately sends a measurement signal in a timeslot corresponding to each second reflector. The at least one second reflector belongs to the first base station. The measurement signal sent in the timeslot corresponding to each second reflector is used by the first UE to select one second reflector as an access reflector for the first UE to access the first base station. In this case, after the first UE accesses the first base station, when a third base station requests a control right on the access reflector, the first base station refuses to release the control right on the access reflector. The third base station is a base station other than the first base station. Because the first base station refuses to release the control right on the access reflector, it is ensured that communication between the first base station and the first UE is not interrupted.

In another possible implementation, the first base station determines a second reflector that can cover the first UE, and communicates with the first UE by using the M first reflectors and the determined second reflector. In this way, the reflector belonging to the first base station and the reflector belonging to the second base station are combined to implement communication between the first base station and the first UE, so that the communication capability of the first UE can be greatly improved.

According to a second aspect, this application provides a communication method. In the method, a second base station receives a coordination request sent by a first base station. The second base station is a base station other than the first base station. The second base station releases a control right on M first reflectors based on the coordination request. The M first reflectors can cover first user equipment UE. The first UE is homed to the first base station. The M first reflectors belong to the second base station, where M is an integer greater than 0. The second base station sends a coordination response to the first base station. The coordination response includes identifiers of the M first reflectors. The coordination response is used for communication between the first base station and the first UE.

Because the second base station releases the control right on the M first reflectors, so that the first base station merely obtains the control right on the M first reflectors from the second base station and communicates with the first UE by using the M first reflectors, in a communication process, the first base station does not use a resource in the second base station, and the second base station does not need to stop using a time-frequency resource occupied by the first UE and does not need to change a transmission direction. Therefore, communication between the second base station and second UE homed to the second base station is not affected, so that a communication capability of the second UE is not affected. This avoids affecting a communication capability of a user in a neighboring cell.

In a possible implementation, the coordination request includes identifiers of N first reflectors that can cover the first UE. The N first reflectors belong to the second base station, where N is an integer greater than or equal to M. The second base station selects the M first reflectors from the first reflectors corresponding to the identifiers of the N first reflectors, and releases the control right on the M first reflectors. In this way, the second base station can select, within a specified range, the first reflector for which the control right can be released.

In another possible implementation, the coordination request includes location description information of the first UE. The second base station determines, based on the location description information, the M first reflectors that can cover the first UE, and releases the control right on the M first reflectors. In this way, the second base station can autonomously determine the first reflector for which the control right can be released.

According to a third aspect, this application provides a communication method. In the method, first user equipment UE measures a signal reflected by N first reflectors belonging to a second base station, so as to obtain identifiers of the N first reflectors. The second base station is a base station other than a first base station. The first UE is homed to the first base station. N is an integer greater than 0. The first UE sends the identifiers of the N first reflectors. The identifiers of the N first reflectors are used by the first base station to obtain a control right on M first reflectors from the second base station. The N first reflectors include the M first reflectors. The first UE communicates with the first base station by using the M first reflectors.

After the first UE sends the identifiers of the N first reflectors, the first base station merely obtains the control right on the M first reflectors from the second base station and communicates with the first UE by using the M first reflectors. Therefore, in a communication process, the first base station does not use a resource in the second base station, and the second base station does not need to stop using a time-frequency resource occupied by the first UE and does not need to change a transmission direction. Therefore, communication between the second base station and second UE homed to the second base station is not affected, so that a communication capability of the second UE is not affected. This avoids affecting a communication capability of a user in a neighboring cell. In addition, after the first base station obtains the control right on the M first reflectors, the first base station and the second base station do not need to exchange data such as control signaling before the first base station communicates with the first UE, that is, the first base station and the first UE can directly communicate with each other. In this way, a communication delay is reduced, and a communication capability of the first UE is improved.

In a possible implementation, the first UE receives a power adjustment parameter sent by the first base station. The power adjustment parameter is determined by the first base station based on channel quality information of an uplink equivalent channel. The uplink equivalent channel includes M cascaded channels, where each cascaded channel includes a channel from the first UE to one first reflector and a channel from the one first reflector to the first base station. The one first reflector is one of the M first reflectors. In this way, the first UE can adjust transmit power of the first UE based on the power adjustment parameter, thereby ensuring that the first UE can communicate with the first base station.

In another possible implementation, the first UE receives cyclic prefix CP length indication information sent by the first base station. The CP length indication information is sent by the first base station based on delay information of the uplink equivalent channel. The uplink equivalent channel includes the M cascaded channels, where each cascaded channel includes a channel from the first UE to one first reflector and a channel from the one first reflector to the first base station. The one first reflector is one of the M first reflectors. In this way, the first UE can adjust a CP length of the first UE based on the CP length indication information, thereby ensuring that the first UE can communicate with the first base station.

In another possible implementation, the first UE receives, in a timeslot corresponding to each of at least one second reflector, a measurement signal sent by the first base station. The first base station is configured to separately activate each second reflector in a timeslot corresponding to the second reflector, and separately send the measurement signal in the timeslot corresponding to each second reflector. The at least one second reflector belongs to the first base station. The first UE selects one reflector from the at least one second reflector based on the measurement signal received in the timeslot corresponding to each second reflector, and accesses the first base station by using the selected reflector. In this way, even if signal quality of the first base station at a location of the first UE is comparatively poor, the first UE can still access the first base station by using the reflector. This ensures that the first base station and the first UE can communicate.

According to a fourth aspect, this application provides a communication apparatus, configured to perform the method in any one of the first aspect or the possible implementations of the first aspect. Specifically, the apparatus includes units configured to perform the method in any one of the first aspect or the possible implementations of the first aspect.

According to a fifth aspect, this application provides a communication apparatus, configured to perform the method in any one of the second aspect or the possible implementations of the second aspect. Specifically, the apparatus includes units configured to perform the method in any one of the second aspect or the possible implementations of the second aspect.

According to a sixth aspect, this application provides a communication apparatus, configured to perform the method in any one of the third aspect or the possible implementations of the third aspect. Specifically, the apparatus includes units configured to perform the method in any one of the third aspect or the possible implementations of the third aspect.

According to a seventh aspect, this application provides a communication apparatus. The apparatus includes a processor, a memory, and a network interface. The processor, the memory, and the network interface may be connected to each other by using a bus system. The memory is configured to store one or more programs. The processor is configured to execute the one or more programs in the memory, so that the apparatus implements the method in any one of the first aspect or the possible implementations of the first aspect.

According to an eighth aspect, this application provides a communication apparatus. The apparatus includes a processor, a memory, and a network interface. The processor, the memory, and the network interface may be connected to each other by using a bus system. The memory is configured to store one or more programs. The processor is configured to execute the one or more programs in the memory, so that the apparatus implements the method in any one of the second aspect or the possible implementations of the second aspect.

According to a ninth aspect, this application provides a communication apparatus. The apparatus includes a processor, a memory, and a network interface. The processor, the memory, and the network interface may be connected to each other by using a bus system. The memory is configured to store one or more programs. The processor is configured to execute the one or more programs in the memory, so that the apparatus implements the method in any one of the third aspect or the possible implementations of the third aspect.

According to a tenth aspect, this application provides a communication apparatus. The apparatus includes a processor, a memory, and a network interface. The processor, the memory, and the network interface may be connected to each other by using a bus system. The memory is configured to store one or more programs. The processor is configured to execute the one or more programs in the memory, so that the apparatus implements the method in any one of the third aspect or the possible implementations of the third aspect.

According to an eleventh aspect, this application provides a computer-readable storage medium. The computer-readable storage medium stores program code. When the program code is run on a computer, the computer is enabled to perform the method in any one of the first aspect, the second aspect, the third aspect, the possible implementations of the first aspect, the possible implementations of the second aspect, or the possible implementations of the third aspect.

According to a twelfth aspect, this application provides a computer program product including program code. When the computer program product is run on a device, the device is enabled to perform the method in any one of the first aspect, the second aspect, the third aspect, the possible implementations of the first aspect, the possible implementations of the second aspect, or the possible implementations of the third aspect.

According to a thirteenth aspect, this application provides a computer-readable storage medium. The computer-readable storage medium stores a program. The program is used to implement the method in any one of the first aspect, the second aspect, the third aspect, the possible implementations of the first aspect, the possible implementations of the second aspect, or the possible implementations of the third aspect.

According to a fourteenth aspect, this application provides a communication system. The communication system includes the apparatus according to the fourth aspect, the apparatus according to the fifth aspect, and the apparatus according to the sixth aspect, or the communication system includes the apparatus according to the seventh aspect, the apparatus according to the eighth aspect, and the apparatus according to the ninth aspect.

DETAILED DESCRIPTION OF ILLUSTRATIVE EMBODIMENTS

Figure 1:
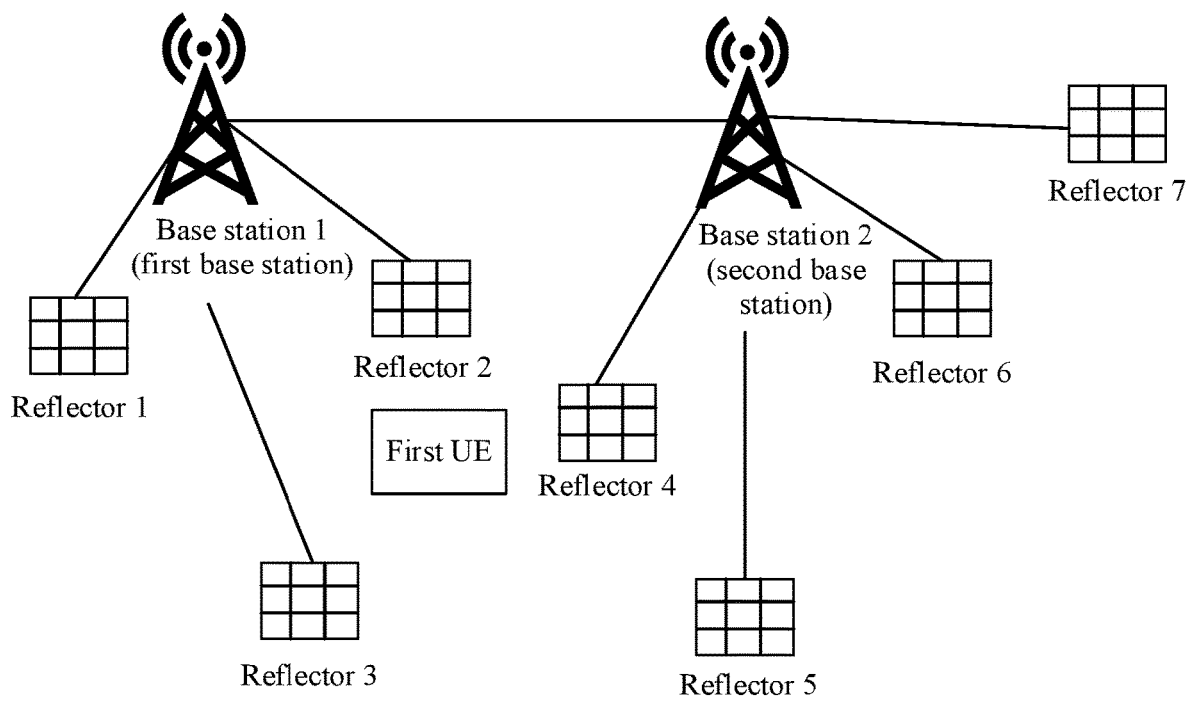
FIG. 1 is a schematic diagram of a network architecture according to an embodiment of this application.

Referring to FIG. 1, an embodiment of this application provides a network architecture. The network architecture includes a plurality of base stations. The plurality of base stations may constitute a coordination set. For each base station in the coordination set, a basic resource belonging to the base station can be shared by all the base stations.

For any base station, a basic resource of the base station includes at least one reflector. The at least one reflector belongs to the base station, and the base station has a control right on each of the at least one reflector.

Optionally, the at least one reflector is a smart reflector, for example, a smart electromagnetic reflector. A reflection phase of each of the at least one reflector is controllable, and the base station can change the reflection phase of each reflector.

For example, referring to the network architecture shown in FIG. 1, the network architecture includes a base station 1 and a base station 2. Basic resources of the base station 1 include a reflector 1, a reflector 2, and a reflector 3. The reflector 1, the reflector 2, and the reflector 3 belong to the base station 1, and the base station 1 has a control right on each of the reflector 1, the reflector 2, and the reflector 3.

Basic resources of the base station 2 include a reflector 4, a reflector 5, a reflector 6, and a reflector 7. The reflector 4, the reflector 5, the reflector 6, and the reflector 7 belong to the base station 2, and the base station 2 has a control right on each of the reflector 4, the reflector 5, the reflector 6, and the reflector 7.

Optionally, basic information of each reflector in the coordination set is stored in each base station in the coordination set, where each reflector in the coordination set is a reflector belonging to each base station. The basic information of the reflector includes information such as an identifier of the reflector, a location of the reflector, and an identifier of the base station to which the reflector belongs. In other words, for any base station in the coordination set, not only basic information of a reflector belonging to the base station but also basic information of a reflector belonging to another base station in the coordination set are stored in the base station. Alternatively, Optionally, referring to FIG. 2, the network architecture further includes a management device. There is a network connection between the management device and each base station in the coordination set. Basic information of each reflector in the coordination set is stored in the management device.

User equipment (UE) may access a base station in the coordination set. For ease of description, the base station is referred to as a first base station, and the UE is referred to as first UE. In this case, the first base station is a home base station of the first UE, and the home base station is the base station accessed by the first UE.

After the first UE accesses the first base station, the first base station may establish a direct channel between the first base station and the first UE, and communicate with the first UE through the direct channel. Alternatively, the first base station determines Z reflectors from reflectors belonging to the first base station, and the first base station communicates with the first UE by using the Z reflectors, where Z is an integer greater than 0.

When the first base station communicates with the first UE by using the Z reflectors, each of the Z reflectors is configured to reflect a signal between the first base station and the first UE. To be specific, when the first base station sends a downlink signal, the Z reflectors can reflect the downlink signal to the first UE; and when the first UE sends an uplink signal, the Z reflectors can reflect the uplink signal to the first base station.

Optionally, when the first base station communicates with the first UE by using the Z reflectors, an equivalent channel between the first base station and the first UE includes Z cascaded channels. The Z cascaded channels are in one-to-one correspondence with the Z reflectors. A cascaded channel corresponding to one reflector includes a channel between the first UE and the reflector and a channel between the reflector and the first base station.

Optionally, the equivalent channel between the first base station and the first UE further includes a direct channel between the first base station and the first UE.

For example, referring to FIG. 1, the first UE accesses the first base station (namely, the base station 1), and the first base station determines the reflector 2 and the reflector 3, and communicates with the first UE by using the reflector 2 and the reflector 3. The equivalent channel between the first base station and the first UE includes a cascaded channel corresponding to the reflector 2, a cascaded channel corresponding to the reflector 3, and the direct channel between the first base station and the first UE.

The cascaded channel corresponding to the reflector 2 includes a channel between the first UE and the reflector 2 and a channel between the reflector 2 and the first base station. The cascaded channel corresponding to the reflector 3 includes a channel between the first UE and the reflector 3 and a channel between the reflector 3 and the first base station.

Optionally, a detailed implementation process in which the first base station determines the Z reflectors and communicates with the first UE by using the Z reflectors is described in detail in the following embodiment shown in FIG. 4.

Optionally, when the first base station needs to send a large amount of to-be-sent data to the first UE, or the first UE needs to send a large amount of to-be-sent data to the first base station, the first base station may further request, from a second base station, a reflector belonging to the second base station. The second base station may release a control right on M reflectors, where M is an integer greater than 0. The second base station is a base station other than the first base station in the coordination set.

In this way, the first base station can obtain the control right on the M reflectors, and communicate with the first UE by using the M reflectors. Alternatively, the first base station communicates with the first UE by using the M reflectors and the Z reflectors.

For ease of description, the reflector belonging to the second base station is referred to as a first reflector, and the reflector belonging to the first base station is referred to as a second reflector. In other words, the first base station communicates with the first UE by using the M first reflectors, or the first base station communicates with the first UE by using the M first reflectors and the Z second reflectors.

Optionally, when the first base station communicates with the first UE by using the M first reflectors, an equivalent channel between the first base station and the first UE includes M cascaded channels. The M cascaded channels are in one-to-one correspondence with the M first reflectors. A cascaded channel corresponding to one first reflector includes a channel between the first UE and the first reflector and a channel between the first reflector and the first base station.

Optionally, when the first base station communicates with the first UE by using the M first reflectors and the Z second reflectors, an equivalent channel between the first base station and the first UE includes not only M cascaded channels but also Z cascaded channels. The Z cascaded channels are in one-to-one correspondence with the Z second reflectors. A cascaded channel corresponding to one second reflector includes a channel between the first UE and the second reflector and a channel between the second reflector and the first base station.

Optionally, when the first base station communicates with the first UE by using the M first reflectors and the Z second reflectors, the equivalent channel between the first base station and the first UE further includes a direct channel between the first base station and the first UE.

Optionally, the first base station may request one or more second base stations to provide a second reflector, and communicate with the first UE by using the requested second reflector. A detailed implementation process is described in detail in the following embodiment shown in FIG. 7.

Figure 3:
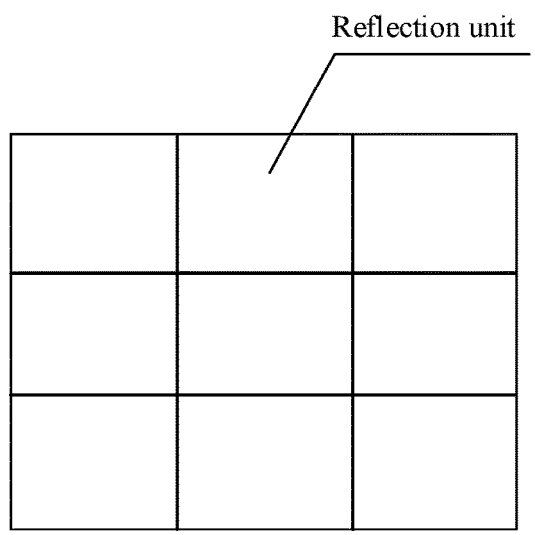
FIG. 3 is a schematic diagram of a structure of a reflector according to an embodiment of this application.

Optionally, referring to FIG. 3, the reflector includes a plurality of reflection units, and each reflection unit is configured to reflect a signal between the first base station and the first UE. When the first base station communicates with the first UE by using the reflector, a reflection phase of the reflection unit in the reflector needs to be first adjusted, so that the reflector can reflect the signal between the first base station and the first UE.

Figure 4:
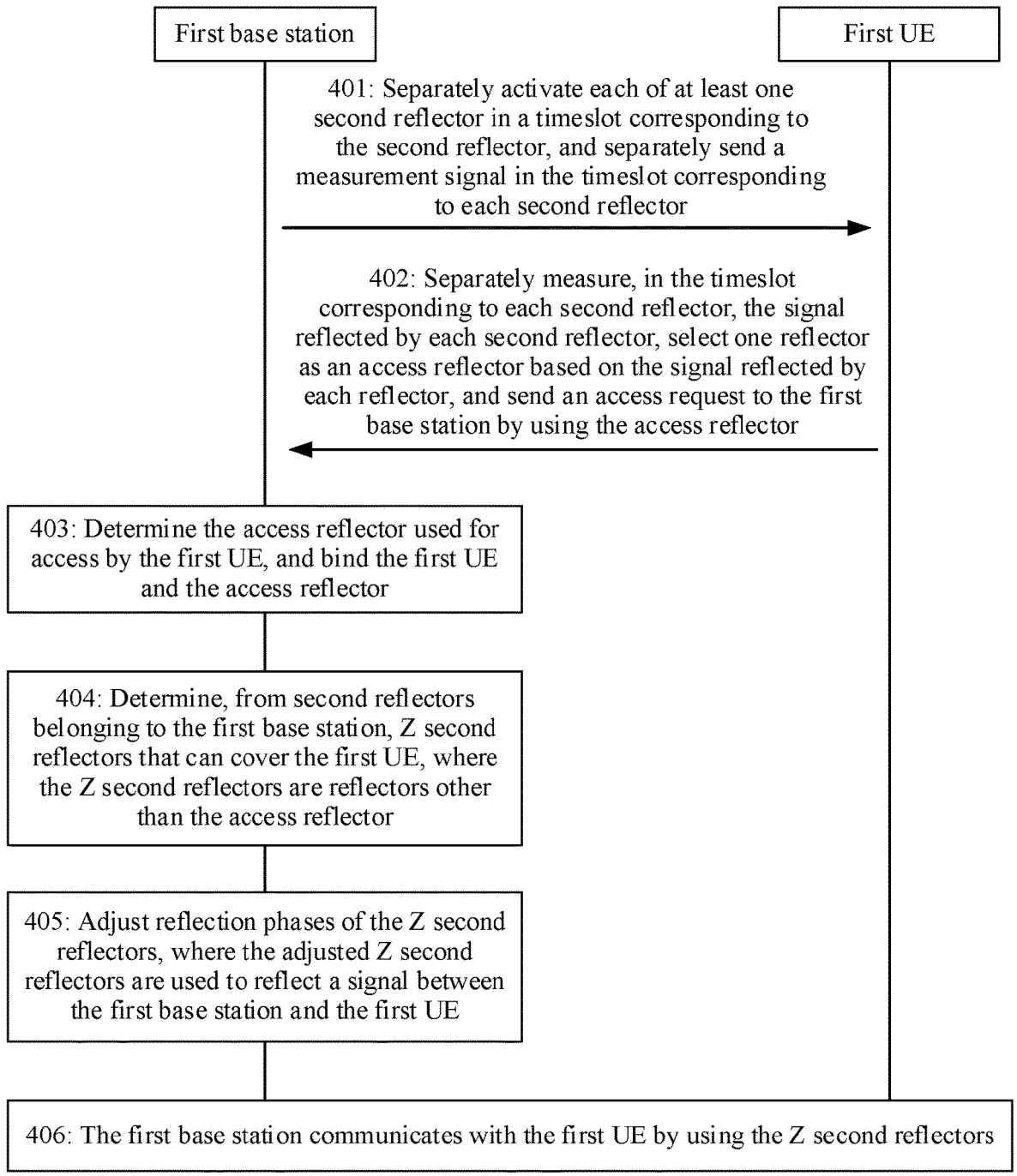
FIG. 4 is a flowchart of a communication method according to an embodiment of this application.

Referring to FIG. 4, an embodiment of this application provides a communication method. The method is applied to the network architecture shown in FIG. 1 or FIG. 2, and includes the following steps.

Step 401: A first base station separately activates each of at least one second reflector in a timeslot corresponding to the second reflector, and separately sends a measurement signal in the timeslot corresponding to each second reflector.

The at least one second reflector is a reflector that belongs to the first base station and that is in an idle state. The first base station can separately activate each second reflector belonging to the first base station, in a timeslot corresponding to the second reflector. In other words, for any second reflector, the first base station activates the second reflector in a timeslot corresponding to the second reflector, and sends a measurement signal after the activation. The second reflector reflects the measurement signal, so that UE entering a coverage area of the first base station measures the signal reflected by the second reflector.

The first base station may periodically perform this step, where one period includes the timeslot corresponding to each second reflector. In one period, the first base station separately activates each second reflector and sends a measurement signal in the timeslot corresponding to the second reflector. In this way, the step of separately activating each second reflector in the timeslot corresponding to the second reflector and sending a measurement signal in the timeslot corresponding to each second reflector is sequentially performed cyclically. In this case, the UE entering the coverage area of the first base station measures, in the timeslot corresponding to each second reflector, the signal reflected by the second reflector, selects one second reflector as an access reflector based on a measurement result, and accesses the first base station by using the access reflector.

This step is implemented through the following operations in steps 4011 and 4012. The operations in steps 4011 and 4012 are as follows:

Step 4011: The first base station sends reflector configuration information, where the reflector configuration information includes an activation time and an identifier of each second reflector in one period.

The reflector configuration information includes the activation time of each second reflector to be activated in one period and the identifier of each second reflector. The activation time of each second reflector is an identifier of a timeslot corresponding to the second reflector.

Optionally, that the activation time of each second reflector is an identifier of a timeslot corresponding to the second reflector means that the identifier of the timeslot corresponding to each second reflector is used to indicate the activation time of the second reflector.

Optionally, the first base station may broadcast the reflector configuration information at a start moment of each period, so as to notify the UE entering the coverage area of the first base station, and the UE determines, based on the reflector configuration information, the second reflector belonging to the first base station and the activation time of the second reflector.

Optionally, the first base station may broadcast the reflector configuration information in a signaling manner. During implementation, the first base station broadcasts a master information block (MIB) and a system information block (SIB). The MIB includes indication information. The indication information is used to indicate, to the UE, that there is a reflector in the coverage area of the first base station. The SIB includes the reflector configuration information.

For ease of description, any UE entering the coverage area of the first base station is referred to as first UE. The first UE receives the MIB, determines, based on the indication information included in the MIB, that there is a reflector in the coverage area of the first base station, receives the SIB, and determines, based on the reflector configuration information included in the SIB, each second reflector and the timeslot corresponding to each second reflector.

Step 4012: The first base station separately activates each second reflector in the timeslot corresponding to the second reflector, and sends the measurement signal in the timeslot corresponding to each second reflector.

Optionally, the measurement signal is a pilot signal.

Step 402: The first UE separately measures, in the timeslot corresponding to each second reflector, the signal reflected by each second reflector, selects one reflector as an access reflector based on the signal reflected by each reflector, and sends an access request to the first base station by using the access reflector.

In this step, the first UE receives the measurement signal in the timeslot corresponding to each second reflector, and measures signal quality of the measurement signal received in the timeslot corresponding to each second reflector, so as to obtain signal quality reflected by each second reflector. The first UE selects, from all second reflectors based on the signal quality reflected by each second reflector, one second reflector meeting a first condition, uses the selected second reflector as the access reflector, and accesses the first base station by using the access reflector, that is, sends the access request to the first base station by using the access reflector.

It should be noted that, for any second reflector, the first base station activates the second reflector in a timeslot corresponding to the second reflector, and sends a measurement signal after the activation. After being activated, the second reflector can reflect the measurement signal. The first UE entering the coverage area of the first base station may receive the measurement signal, and measure signal quality of the measurement signal, so as to obtain signal quality reflected by the second reflector.

The first condition is to select a reflector whose reflected signal quality is the best, or the first condition is to select a reflector whose reflected signal quality exceeds a quality threshold.

Optionally, the first UE selects the access reflector in the following two manners. The two manners are described as follows.

Figure 5:
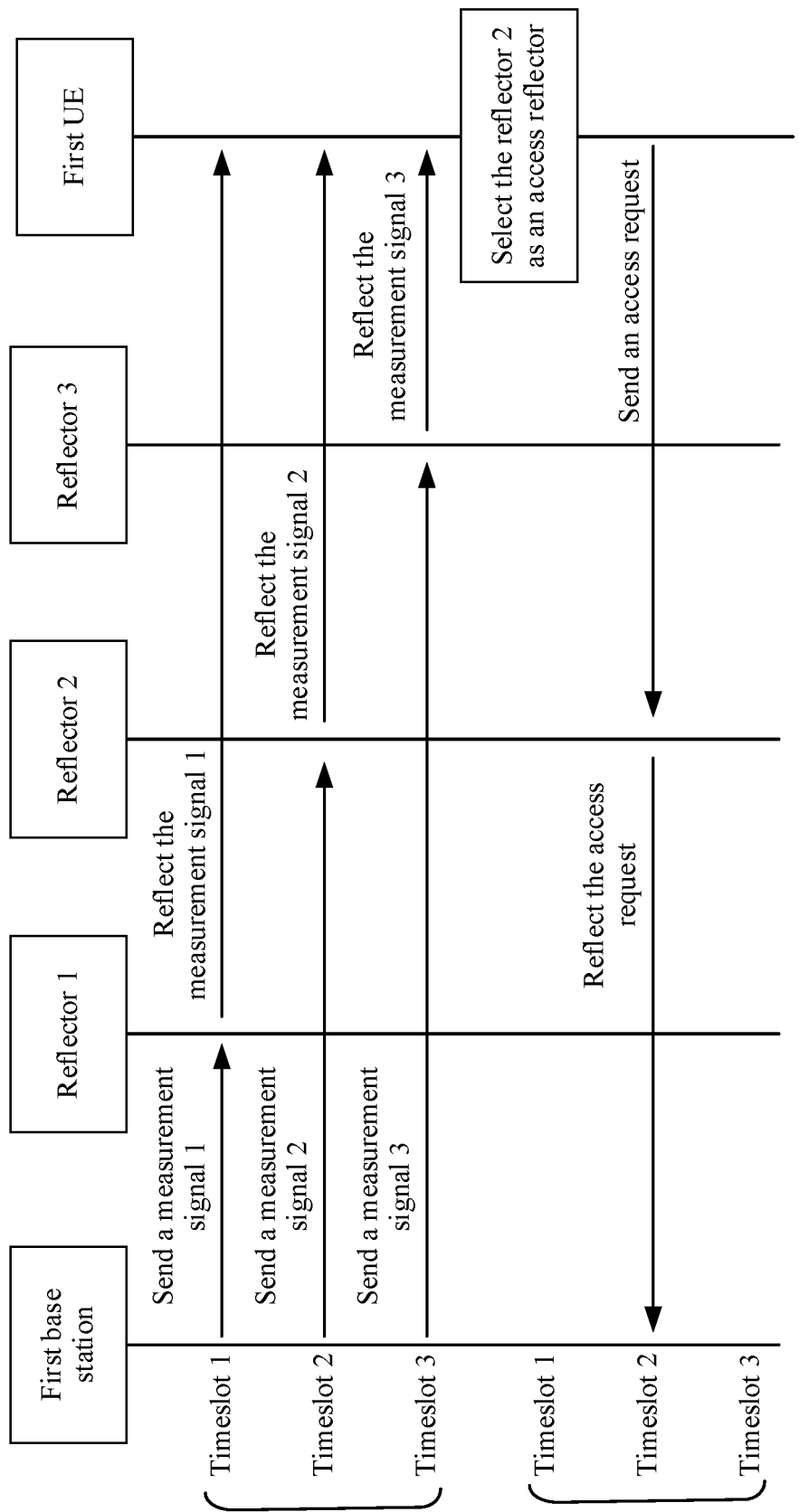
FIG. 5 is a flowchart of an access method according to an embodiment of this application.

Referring to FIG. 5, in a first manner, the first UE first separately measures, in a current period, the signal quality reflected by each second reflector, selects, based on the signal quality reflected by each second reflector, one second reflector meeting the first condition as the access reflector, and accesses the first base station by using the access reflector in a next period.

In the first manner, the first UE separately measures, in the timeslot corresponding to each second reflector in the current period, the signal quality reflected by each second reflector, selects, from all the second reflectors based on the signal quality reflected by each second reflector, one second reflector meeting the first condition as the access reflector, and sends the access request to the first base station by using the access reflector in a timeslot that corresponds to the access reflector and that is included in the next period.

Figure 2:
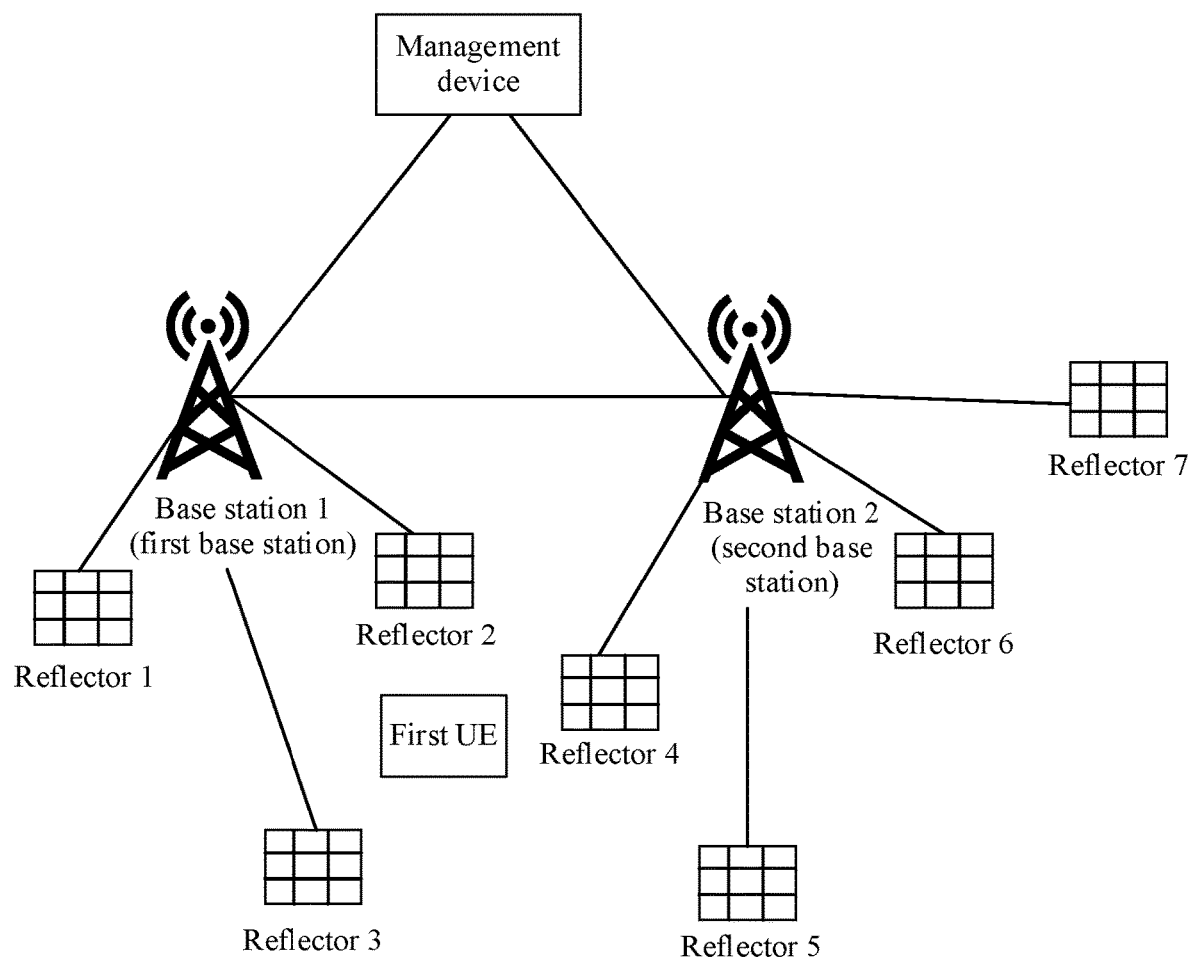
FIG. 2 is a schematic diagram of another network architecture according to an embodiment of this application.

For example, for the foregoing example shown in FIG. 1 or FIG. 2, referring to FIG. 5, the first base station activates the reflector 1 in a timeslot 1 corresponding to the reflector 1 in the current period, and sends a measurement signal 1; and the first UE measures signal quality of the measurement signal 1, so as to obtain signal quality reflected by the reflector 1. The first base station activates the reflector 2 in a timeslot 2 corresponding to the reflector 2 in the current period, and sends a measurement signal 2; and the first UE measures signal quality of the measurement signal 2, so as to obtain signal quality reflected by the reflector 2. The first base station activates the reflector 3 in a timeslot 3 corresponding to the reflector 3 in the current period, and sends a measurement signal 3; and the first UE measures signal quality of the measurement signal 3, so as to obtain signal quality reflected by the reflector 3.

The first UE selects the reflector 2 from the reflector 1, the reflector 2, and the reflector 3 as the access reflector based on the signal quality reflected by the reflector 1, the signal quality reflected by the reflector 2, and the signal quality reflected by the reflector 3. The first UE sends the access request to the first base station by using the access reflector in a timeslot 2 that corresponds to the access reflector and that is included in the next period.

Figure 6:
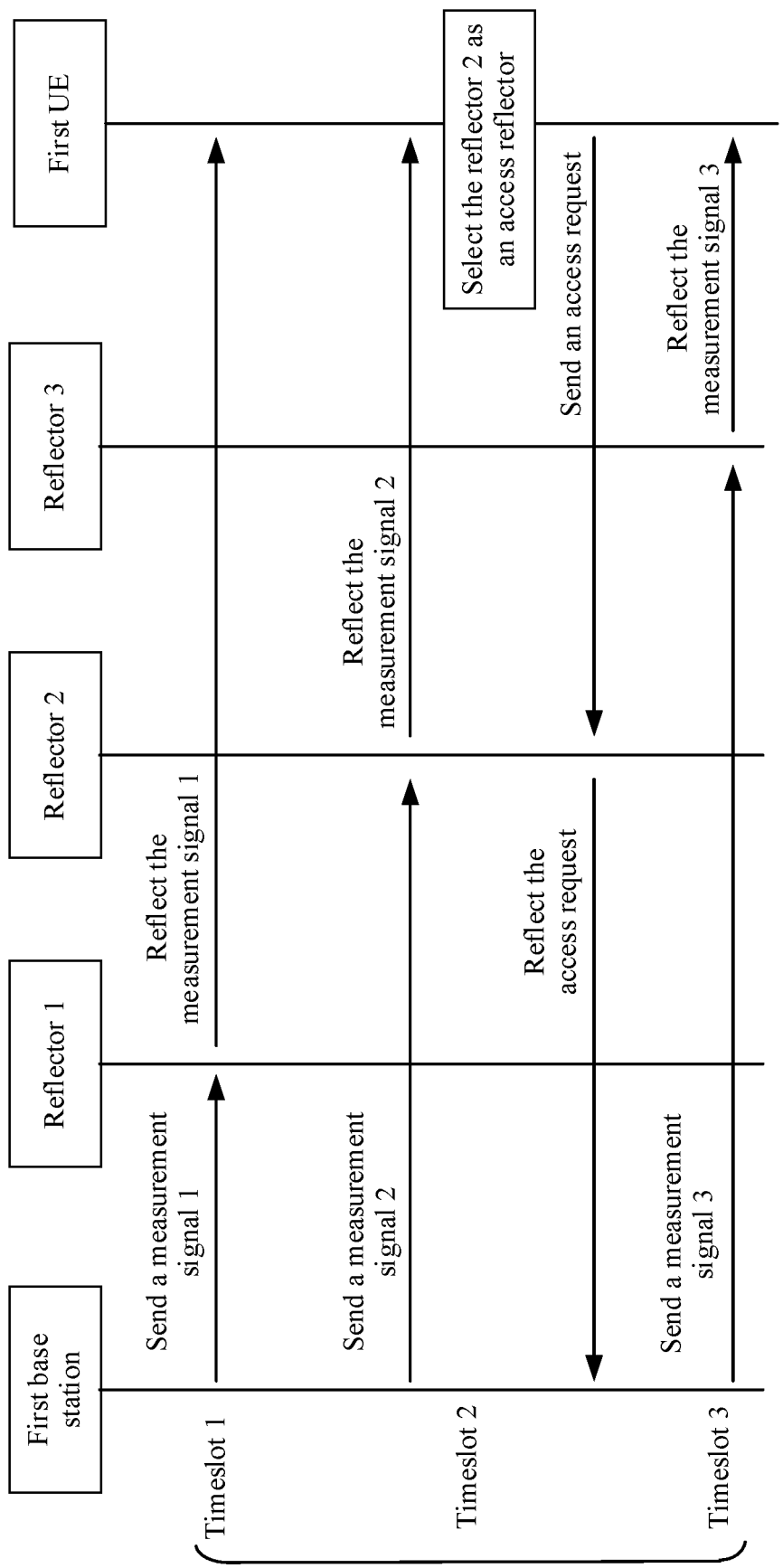
FIG. 6 is a flowchart of another access method according to an embodiment of this application.

Referring to FIG. 6, in a second manner, the first UE measures, in a timeslot corresponding to a second reflector, signal quality reflected by the second reflector, selects the second reflector as the access reflector when the signal quality exceeds the quality threshold, and accesses the first base station by using the access reflector in a timeslot corresponding to the access reflector in a current period.

For example, for the foregoing example shown in FIG. 1 or FIG. 2, referring to FIG. 6, the first base station activates the reflector 1 in a timeslot 1 corresponding to the reflector 1 in the current period, and sends a measurement signal 1; and the first UE measures signal quality of the measurement signal 1, so as to obtain signal quality reflected by the reflector 1. Assuming that the signal quality reflected by the reflector 1 does not exceed the quality threshold, measurement continues. The first base station activates the reflector 2 in a timeslot 2 corresponding to the reflector 2 in the current period, and sends a measurement signal 2; and the first UE measures signal quality of the measurement signal 2, so as to obtain signal quality reflected by the reflector 2. Assuming that the signal quality reflected by the reflector 2 exceeds the quality threshold, the first UE selects the reflector 2 as the access reflector, and sends the access request to the first base station by using the access reflector in the timeslot 2.

Step 403: The first base station receives the access request sent by the first UE, determines the access reflector used for access by the first UE, and binds the first UE and the access reflector.

In this step, the first base station determines a current timeslot in which the access request is received, determines a reflector corresponding to the current timeslot, uses the determined reflector as the access reflector used by the first UE to access the first base station, and correspondingly stores an identifier of the first UE and an identifier of the access reflector in a correspondence between a UE identifier and an access reflector identifier.

For example, referring to FIG. 5 and FIG. 6, the first base station receives the access request, determines that the access request is received in the timeslot 2, determines the reflector 2 corresponding to the timeslot 2, and uses the reflector 2 as the access reflector used by the first UE to access the first base station.

After the first UE accesses the first base station, the first base station may communicate with the first UE by using Z second reflectors belonging to the first base station, where Z is an integer greater than 0. A detailed implementation process is as follows.

Step 404: The first base station determines, from second reflectors belonging to the first base station, Z second reflectors that can cover the first UE, where the Z second reflectors are reflectors other than the access reflector.

In this step, the Z second reflectors may be determined in the following manner 1 and manner 2. The manner 1 and the manner 2 are described as follows.

Manner 1: The first base station determines, based on location description information of the first UE and from the second reflectors belonging to the first base station, the Z second reflectors that can cover the first UE.

Optionally, the location description information includes at least one of a location of the first UE, coordinate system information of the first UE, uplink channel information of the first UE, downlink channel information of the first UE, multipath delay information of the first UE, time difference information of arriving at the first UE from different base stations, and the like.

In the manner 1, the first base station may obtain the location description information of the first UE, determine the location of the first UE based on the location description information of the first UE, and determine, based on the location of the first UE and from the second reflectors belonging to the first base station, the Z second reflectors that can cover the first UE.

Optionally, the location description information of the first UE includes the location of the first UE. In this case, the first base station directly obtains the location of the first UE from the location description information of the first UE. Alternatively, Optionally, the location description information of the first UE includes at least one of the coordinate system information of the first UE, the uplink channel information of the first UE, the downlink channel information of the first UE, the multipath delay information of the first UE, the time difference information of arriving at the first UE from different base stations, and the like. The first base station obtains the location of the first UE based on at least one of the coordinate system information of the first UE, the uplink channel information of the first UE, the downlink channel information of the first UE, the multipath delay information of the first UE, the time difference information of arriving at the first UE from different base stations, and the like.

Optionally, the Z second reflectors are reflectors other than the access reflector. Alternatively, the Z second reflectors are idle reflectors.

Optionally, the first base station may determine, based on an identifier of each access reflector included in the correspondence between an access reflector identifier and a UE identifier, each access reflector belonging to the first base station. The first base station removes the determined access reflector from all second reflectors that can cover the first UE, and selects the Z second reflectors from the rest of the second reflectors.

Optionally, all of the Z second reflectors are second reflectors in an idle state, or the first base station can select, from the rest of the second reflectors, not only a second reflector in an idle state but also a second reflector being used by other UE.

Optionally, when selecting the second reflector being used by other UE, the first base station may select one or more second reflectors being used by other UE whose currently transmitted data amount is comparatively small. For example, the first base station may select one or more second reflectors being used by other UE whose currently transmitted data amount is less than a data amount threshold.

Optionally, when the second reflector in the idle state is selected, each reflection unit in the second reflector is allocated to the first UE. When the second reflector being used by other UE is selected, the first base station may select each reflection unit in the second reflector for the first UE, that is, allocate each reflection unit in the second reflector to the first UE; or the first base station may select some of reflection units in the second reflector for the first UE, that is, allocate some of reflection units in the second reflector to the first UE.

Manner 2: The first base station receives a request message sent by the first UE. The request message includes identifiers of X second reflectors. The X second reflectors are selected by the first UE by measuring the signal reflected by the second reflector. X is an integer greater than or equal to Z. The first base station selects the Z second reflectors from the X second reflectors corresponding to the identifiers of the X second reflectors.

In the manner 2, the first UE measures the signal reflected by each second reflector belonging to the first base station, so as to obtain the signal quality reflected by each second reflector, selects, based on the signal quality reflected by each second reflector, the X second reflectors meeting a third condition, and sends the request message to the first base station, where the request message includes the identifiers of the X second reflectors.

The third condition includes X reflectors whose reflected signal quality exceeds a quality threshold or X reflectors whose reflected signal quality is the best. In other words, the first UE selects, based on the signal quality reflected by each second reflector, the X second reflectors whose reflected signal quality exceeds the quality threshold or the X second reflectors whose reflected signal quality is the best.

Optionally, a sequence of the identifiers of the X second reflectors in the request message may be a sequence in which the identifiers are arranged based on the signal quality reflected by the X second reflectors.

Optionally, the first base station may determine, based on an identifier of each access reflector included in the correspondence between an access reflector identifier and a UE identifier, each access reflector belonging to the first base station. The first base station removes the access reflector from the X second reflectors corresponding to the identifiers of the X second reflectors, and selects the Z second reflectors from the rest of the second reflectors.

Optionally, the first base station selects Z idle second reflectors from the rest of the second reflectors.

Optionally, all of the Z second reflectors are idle second reflectors, or the first base station can select, from the rest of the second reflectors, not only an idle second reflector but also a second reflector being used by other UE. For a detailed selection process, refer to related content in the foregoing manner 1. Details are not described herein again.

Step 405: The first base station adjusts reflection phases of the Z second reflectors, where the adjusted Z second reflectors are used to reflect a signal between the first base station and the first UE.

The adjusted Z second reflectors are used to reflect, to the first UE, a downlink signal sent by the first base station to the first UE, and are used to reflect, to the first base station, an uplink signal sent by the first UE to the first base station.

In this step, the first base station obtains a target reflection coefficient set corresponding to each second reflector included in the Z second reflectors, and adjusts a reflection phase of each second reflector based on a target reflection coefficient set corresponding to the second reflector.

Optionally, for any one of the Z second reflectors, the second reflector includes one or more reflection units, and a target reflection coefficient set corresponding to the second reflector includes a target reflection coefficient corresponding to the reflection unit in the second reflector.

Optionally, adjusting a reflection phase of the second reflector may be: adjusting a reflection phase of the reflection unit in the second reflector based on the target reflection coefficient corresponding to the reflection unit in the second reflector.

In this step, the reflection phases of the Z second reflectors are adjusted through the following first implementation and second implementation. The first implementation is: adjusting the reflection phases of the Z second reflectors at a time. In the first implementation, the first base station obtains, at a time, target reflection coefficient sets corresponding to the Z second reflectors, and adjusts the reflection phases of the Z second reflectors respectively based on the target reflection coefficient sets corresponding to the Z second reflectors.

The second implementation is: adjusting the reflection phases of the Z second reflectors in batches. In the second implementation, the first base station obtains, in batches, target reflection coefficient sets corresponding to the Z second reflectors, that is, obtains, in each batch, a target reflection coefficient set corresponding to some of the Z second reflectors; and the first base station separately adjusts a reflection phase of each second reflector in the some of the second reflectors based on a target reflection coefficient set corresponding to the second reflector in the some of the second reflectors.

Optionally, in this step, the reflection phases of the Z second reflectors may be adjusted through the following operations in steps 4051 to 4055. The operations in steps 4051 to 4055 are as follows.

Step 4051: The first base station generates a plurality of control vectors, where all of the plurality of control vectors are orthogonal to each other, and any one of the plurality of control vectors includes a test reflection coefficient set corresponding to each second reflector.

Optionally, each of the Z second reflectors includes a plurality of reflection units, and a test reflection coefficient set corresponding to one second reflector includes test reflection coefficients corresponding to reflection units in the second reflector.

It is assumed that a quantity of reflection units included in one second reflector is denoted by K. In this case, the test reflection coefficient set corresponding to one second reflector includes K test reflection coefficients, and the K test reflection coefficients are in one-to-one correspondence with the K reflection units.

When the first implementation is used for this step, if the first base station allocates all reflection units in the Z second reflectors to the first UE, a quantity of reflection units in each second reflector is K. Because one control vector includes the test reflection coefficient set corresponding to each second reflector, and the test reflection coefficient set corresponding to one second reflector includes the test reflection coefficients corresponding to the K reflection units in the second reflector, one control vector includes Z*K test reflection coefficients. In addition, in the operation in step 4051, the first base station can generate Z*K+1 control vectors that are orthogonal to each other.

If the first base station allocates all reflection units in some of the Z second reflectors to the first UE, and allocates some of reflection units in the rest of the second reflectors to the first UE, assuming that V reflection units in the Z second reflectors are allocated to the first UE, one control vector includes V test reflection coefficients, and in the operation in step 4051, the first base station can generate V+1 control vectors that are orthogonal to each other.

When the second implementation is used for this step, that is, the reflection phases of the Z second reflectors are adjusted in batches, it is assumed that reflection phases of W second reflectors are adjusted in each batch, where W is an integer greater than 0 and less than Z. If the first base station allocates all reflection units in the W second reflectors to the first UE, in the operation in step 4051, the first base station generates W*K+1 control vectors that are orthogonal to each other, where each control vector includes W*K test reflection coefficients. If the first base station allocates all reflection units in some of the W second reflectors to the first UE, and allocates some of reflection units in the rest of the second reflectors to the first UE, assuming that Q reflection units in the W second reflectors are allocated to the first UE, one control vector includes Q test reflection coefficients, and in the operation in step 4051, the first base station can generate Q control vectors that are orthogonal to each other.

Step 4052: For any one of the plurality of control vectors, the first base station sends the control vector to a plurality of second reflectors and the first UE, and then sends a measurement signal.

Optionally, when the first implementation is used, if the first base station generates Z*K+1 control vectors, the first base station sends the Z*K+1 control vectors at Z*K+1 times. The first base station sends one of the Z*K+1 control vectors to the Z second reflectors and the first UE each time, and sends a measurement signal after sending the one control vector. If the first base station generates V control vectors, the first base station sends the V+1 control vectors at V times. The first base station sends one of the V+1 control vectors to the Z second reflectors and the first UE each time, and sends a measurement signal after sending the one control vector.

For any one of the Z second reflectors, the second reflector receives the control vector, obtains, from the control vector, a test reflection coefficient corresponding to a reflection unit in the second reflector, and adjusts a reflection phase of the reflection unit in the second reflector based on the test reflection coefficient corresponding to the reflection unit in the second reflector. Then, the second reflector reflects the measurement signal sent by the first base station.

Optionally, when the second implementation is used, if the first base station generates W*K+1 control vectors, the first base station sends the W*K+1 control vectors at W*K+1 times. The first base station sends the control vector to the W second reflectors and the first UE each time, and sends a measurement signal after sending the control vector. If the first base station generates Q control vectors, the first base station sends the Q+1 control vectors at Q times. The first base station sends one of the Q+1 control vectors to the W second reflectors and the first UE each time, and sends a measurement signal after sending the one control vector.

For any one of the W second reflectors, the second reflector receives the control vector, obtains, from the control vector, a test reflection coefficient corresponding to a reflection unit in the second reflector, and adjusts a reflection phase of the reflection unit in the second reflector based on the test reflection coefficient corresponding to the reflection unit in the second reflector. Then, the second reflector reflects the measurement signal sent by the first base station.

Optionally, when sending one control vector, the first base station further sends coefficient indication information. The coefficient indication information is used to indicate a second reflector corresponding to each test reflection coefficient in the control vector and one reflection unit in the second reflector. After receiving the control vector and the coefficient indication information, the second reflector obtains, from the control vector based on the coefficient indication information, a test reflection coefficient corresponding to the reflection unit in the second reflector.

Step 4053: The first UE receives the control vector, and measures downlink equivalent channel quality information from the first base station to the first UE, where the control vector corresponds to the downlink equivalent channel quality information.

After the first base station sends one control vector and a measurement signal, the first UE can receive the measurement signal reflected by the second reflector, and measure the measurement signal to obtain downlink equivalent channel quality information corresponding to the control vector.

Optionally, when the first implementation is used, the downlink equivalent channel quality information includes Z+1 pieces of downlink channel quality information. The Z+1 pieces of downlink channel quality information include quality information of Z downlink cascaded channels and quality information of a direct downlink channel from the first base station to the first UE. The Z downlink cascaded channels are in one-to-one correspondence with the Z second reflectors. A downlink cascaded channel corresponding to one second reflector includes a channel from the first base station to the second reflector and a channel from the second reflector to the first UE.

Optionally, the first base station and the first UE repeatedly perform the foregoing operations in steps 4052 and 4053 until the first base station completes sending the Z*K+1 control vectors. In this case, the first UE obtains Z*K+1 pieces of downlink equivalent channel quality information through measurement and the Z*K+1 control vectors. The Z*K+1 pieces of downlink equivalent channel quality information are in one-to-one correspondence with the Z*K+1 control vectors. Alternatively, the first base station and the first UE repeatedly perform the foregoing operations in steps 4052 and 4053 until the first base station completes sending the V+1 control vectors. In this case, the first UE obtains V+1 pieces of downlink equivalent channel quality information through measurement and the V+1 control vectors. The V+1 pieces of downlink equivalent channel quality information are in one-to-one correspondence with the V+1 control vectors. Then, the following operations in step 4054 are performed.

Optionally, when the second implementation is used, the downlink equivalent channel quality information includes W+1 pieces of downlink channel quality information. The W+1 pieces of downlink channel quality information include quality information of W downlink cascaded channels and quality information of a direct downlink channel from the first base station to the first UE. The W downlink cascaded channels are in one-to-one correspondence with the W second reflectors.

Optionally, the first base station and the first UE repeatedly perform the foregoing operations in steps 4052 and 4053 until the first base station completes sending the W*K+1 control vectors. In this case, the first UE obtains W*K+1 pieces of downlink equivalent channel quality information through measurement and the W*K+1 control vectors. The W*K+1 pieces of downlink equivalent channel quality information are in one-to-one correspondence with the W*K+1 control vectors. Alternatively, the first base station and the first UE repeatedly perform the foregoing operations in steps 4052 and 4053 until the first base station completes sending the Q+1 control vectors. In this case, the first UE obtains Q+1 pieces of downlink equivalent channel quality information through measurement and the Q+1 control vectors. The Q+1 pieces of downlink equivalent channel quality information are in one-to-one correspondence with the Q+1 control vectors. Then, the following operations in step 4054 are performed.

Step 4054: The first UE obtains, based on the plurality of control vectors and downlink equivalent channel quality information corresponding to each of the plurality of control vectors, a target reflection coefficient set corresponding to each second reflector, and sends the target reflection coefficient set corresponding to each second reflector to the first base station.

Optionally, when the first implementation is used, the first UE obtains, based on the Z*K+1 pieces of downlink equivalent channel quality information and the Z*K+1 control vectors, the target reflection coefficient set corresponding to each of the Z second reflectors. For a target reflection coefficient set corresponding to any second reflector, the target reflection coefficient set includes a target reflection coefficient corresponding to each reflection unit in the second reflector. The first UE sends the target reflection coefficient sets corresponding to the Z second reflectors to the first base station. Alternatively, the first UE obtains, based on the V+1 pieces of downlink equivalent channel quality information and the V+1 control vectors, the target reflection coefficient set corresponding to each of the Z second reflectors. For a target reflection coefficient set corresponding to any second reflector, the target reflection coefficient set includes a target reflection coefficient corresponding to a reflection unit that is in the second reflector and that is allocated to the first UE. The first UE sends the target reflection coefficient sets corresponding to the Z second reflectors to the first base station.

Optionally, when the second implementation is used, the first UE obtains, based on the W*K+1 pieces of downlink equivalent channel quality information and the W*K+1 control vectors, the target reflection coefficient set corresponding to each of the W second reflectors. For a target reflection coefficient set corresponding to any second reflector, the target reflection coefficient set includes a target reflection coefficient corresponding to each reflection unit in the second reflector. The first UE sends target reflection coefficient sets corresponding to the W second reflectors to the first base station. Alternatively, the first UE obtains, based on the Q+1 pieces of downlink equivalent channel quality information and the Q+1 control vectors, the target reflection coefficient set corresponding to each of the W second reflectors. For a target reflection coefficient set corresponding to any second reflector, the target reflection coefficient set includes a target reflection coefficient corresponding to a reflection unit that is in the second reflector and that is allocated to the first UE. The first UE sends target reflection coefficient sets corresponding to the W second reflectors to the first base station.

Step 4055: The first base station receives the target reflection coefficient set corresponding to each second reflector, and separately adjusts a reflection phase of each second reflector based on a target reflection coefficient set corresponding to the second reflector.

Optionally, when the first implementation is used, the first base station receives the target reflection coefficient sets corresponding to the Z second reflectors, and separately sends, to each of the Z second reflectors, a target reflection coefficient set corresponding to the second reflector. For any one of the Z second reflectors, the second reflector receives one target reflection coefficient set, and adjusts a reflection unit in the second reflector based on the target reflection coefficient set.

Optionally, when the second implementation is used, the first base station receives the target reflection coefficient sets corresponding to the W second reflectors, and separately sends, to each of the W second reflectors, a target reflection coefficient set corresponding to the second reflector. For any one of the W second reflectors, the second reflector receives one target reflection coefficient set, and adjusts a reflection unit in the second reflector based on the target reflection coefficient set.

When the second implementation is used, for a second reflector that is in the Z second reflectors and whose reflection phase is not yet adjusted, the foregoing operations in steps 4051 to 4055 are repeatedly performed until the reflection phases of all of the Z second reflectors are adjusted.

Optionally, when the second implementation is used, the first base station may first adjust reflection phases of some of the second reflectors. After the adjustment, the first base station may communicate with the first UE by using the some of the second reflectors. Because a quantity of reflectors adjusted in each batch is comparatively small, reflection phases of one batch of second reflectors are quickly adjusted, and communication between the first base station and the first UE is implemented by using the batch of second reflectors, thereby improving communication efficiency. Then, reflection phases of the rest of the second reflectors are adjusted in a process of communication between the first base station and the first UE.

Step 406: The first base station communicates with the first UE by using the Z second reflectors.

In this step, when the first base station sends a downlink signal to the first UE, the Z second reflectors reflect the downlink signal to the first UE. Alternatively, when the first UE sends an uplink signal to the first base station, the Z second reflectors reflect the uplink signal to the first base station.

Optionally, before this step is performed, transmit power of the first UE may further need to be adjusted. During implementation, the first base station measures channel quality information of an uplink equivalent channel between the first base station and the first UE. The uplink equivalent channel includes Z cascaded channels. The Z cascaded channels are in one-to-one correspondence with the Z second reflectors. A cascaded channel corresponding to one second reflector includes a channel from the first UE to the one second reflector and a channel from the one second reflector to the first base station. The first base station determines a power adjustment parameter of the first UE based on the channel quality information of the uplink equivalent channel, and sends the power adjustment parameter to the first UE.

The first UE receives the power adjustment parameter, and adjusts the transmit power of the first UE based on the power adjustment parameter. After the adjustment, the first UE can communicate with the first base station.

Optionally, the uplink equivalent channel further includes a direct channel from the first UE to the first base station.

Optionally, the transmit power of the first UE may be adjusted in a dynamic manner or a semi-static manner.

When the transmit power of the first UE is adjusted in the dynamic manner, the power adjustment parameter includes a power adjustment step and a power adjustment indication. The power adjustment indication is a power increase indication or a power decrease indication. When the power adjustment parameter includes the power increase indication, the first UE increases the transmit power of the first UE based on the power adjustment step included in the power adjustment parameter. When the power adjustment parameter includes the power decrease indication, the first UE decreases the transmit power of the first UE based on the power adjustment step included in the power adjustment parameter.

When the transmit power of the first UE is adjusted in the semi-static manner, the first base station and the first UE may agree on a power adjustment step in advance. The power adjustment parameter determined by the first base station includes a power adjustment indication. The power adjustment indication is a power increase indication or a power decrease indication. When the power adjustment parameter is the power increase indication, the first UE increases the transmit power of the first UE based on the power adjustment step. When the power adjustment parameter is the power decrease indication, the first UE decreases the transmit power of the first UE based on the power adjustment step.

When the first UE sends an uplink signal, the first UE may send the uplink signal based on adjusted transmit power.

Optionally, before this step is performed, a cyclic prefix (CP) length of the first UE may further need to be adjusted. During implementation, the first base station measures delay information of the uplink equivalent channel between the first base station and the first UE, and sends CP length indication information to the first UE based on the delay information.

The first UE adjusts the CP length of the first UE based on the CP length indication information. After the adjustment, the first UE can communicate with the first base station.

Optionally, the delay information of the uplink equivalent channel includes delays of the Z cascaded channels.

Optionally, the delay information of the uplink equivalent channel further includes a delay of the direct channel from the first UE to the first base station.

Optionally, an operation of obtaining the CP length indication information by the first base station may be as follows: The first base station selects a longest delay from the delay information of the uplink equivalent channel, determines the CP length of the first UE based on the longest delay, obtains, from a correspondence between a standard CP length and CP length indication information, a standard CP length whose difference from the CP length is the smallest, and obtains, from the correspondence between a standard CP length and CP length indication information, the CP length indication information corresponding to the standard CP length.

Optionally, after receiving the CP length indication information, the first UE obtains, based on the CP length indication information, the corresponding standard CP length from the correspondence between a standard CP length and CP length indication information, and adjusts the CP length of the first UE based on the obtained standard CP length.

Optionally, the first base station and the first UE may agree on the correspondence between a standard CP length and CP length indication information in advance.

Optionally, when the first base station adjusts the reflection phase of the second reflector by using the foregoing second implementation, the transmit power and/or the CP length of the first UE are/is adjusted in the foregoing manner each time reflection phases of one batch of second reflectors are adjusted by the first base station.

In a process in which the first base station communicates with the first UE by using the Z second reflectors, a large amount of to-be-transmitted data may need to be transmitted between the first base station and the first UE. In this case, a first reflector belonging to a second base station may be requested, to assist the first base station and the first UE in data transmission. A detailed implementation process is described in detail in the following embodiment shown in FIG. 7.

In this embodiment of this application, the first base station determines the Z second reflectors, to use the Z second reflectors to reflect a downlink signal sent by the first base station to the first UE and reflect an uplink signal sent by the first UE to the first base station. In this way, downlink signal quality at the first UE and uplink signal quality sent by the first UE to the first base station can be enhanced, thereby greatly improving a communication capability of the first UE.

Figure 7:
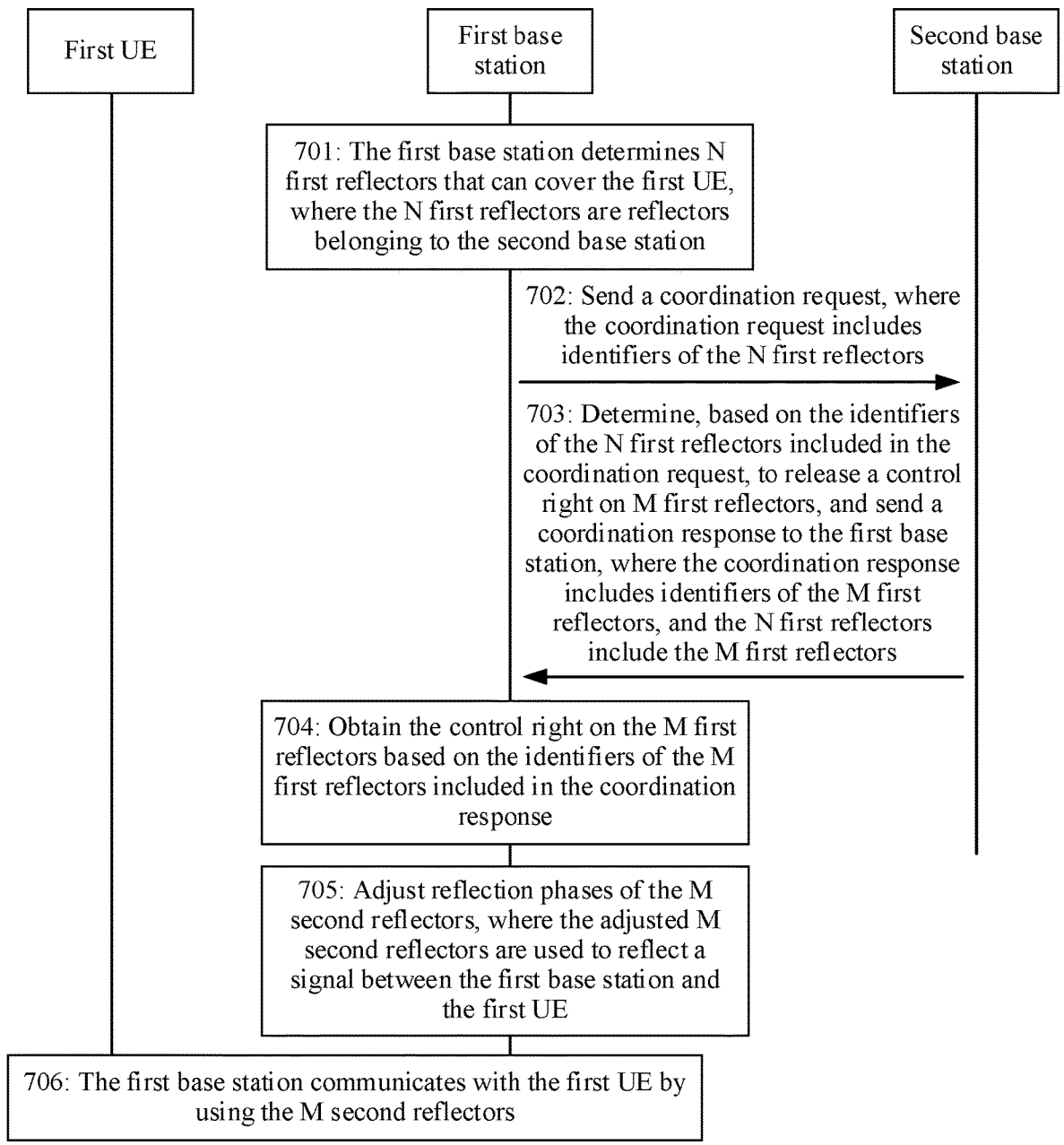
FIG. 7 is a flowchart of another communication method according to an embodiment of this application.

Referring to FIG. 7, an embodiment of this application provides a communication method. The method is applied to the network architecture shown in FIG. 1 or FIG. 2, and includes the following steps.

Step 701: A first base station determines N first reflectors that can cover first UE, where the N first reflectors are reflectors belonging to a second base station, and N is an integer greater than 0.

The second base station is a base station other than the first base station in a coordination set.

In this step, the N first reflectors may be determined in the following manner 1 and manner 2. The manner 1 and the manner 2 are described as follows.

Manner 1: The first base station determines, based on location description information of the first UE, a neighboring cell that can cover the first UE, and determines, from reflectors belonging to the neighboring cell, the N first reflectors that can cover the first UE.

Basic information of each reflector in the coordination set is stored in the first base station. The basic information of the reflector includes an identifier of the reflector, a location of the reflector, and an identifier of a base station to which the reflector belongs (the identifier of the base station includes an identifier of a cell belonging to the base station).

The first base station obtains a location of the first UE based on the location description information of the first UE, determines, based on the location of the first UE, the neighboring cell that can cover the first UE, obtains, based on the stored basic information of each reflector in the coordination set, an identifier of each reflector belonging to the neighboring cell, and selects N second reflectors from all second reflectors in the neighboring cell based on the location of the first UE and a location of each second reflector in the neighboring cell.

Optionally, the first base station obtains a distance between the first UE and each second reflector in the neighboring cell based on the location of the first UE and the location of each second reflector in the neighboring cell, and selects N second reflectors whose distances from the first UE are less than a distance threshold.

Optionally, the first base station may determine at least one neighboring cell, and select one or more first reflectors from reflectors of each neighboring cell.

Optionally, in the manner 1, when the first base station needs to send a large amount of data to the first UE or receives a sent request, the first base station performs the operations in the manner 1.

Optionally, the request is sent by the first UE when the first UE needs to send a large amount of data to the first base station.

For example, referring to FIG. 1 or FIG. 2, the first base station determines a neighboring cell covering the first UE, where the neighboring cell includes the reflector 4, the reflector 5, the reflector 6, and the reflector 7; and the first base station obtains distances between the first UE and the reflector 4, the reflector 5, the reflector 6, and the reflector 7 based on the location of the first UE, basic information of the reflector 4, basic information of the reflector 5, basic information of the reflector 6, and basic information of the reflector 7, and selects the reflector 4 and the reflector 5 whose distances from the first UE are less than the distance threshold.

Manner 2: The first base station receives a coordination request sent by the first UE. The coordination request includes identifiers of the N first reflectors and an identifier of the second base station, where the N first reflectors are selected by the first UE by measuring a signal reflected by a first reflector.

In the manner 2, the first UE measures the signal reflected by each first reflector belonging to the second base station, so as to obtain signal quality reflected by each first reflector, selects, based on the signal quality reflected by each first reflector, the N first reflectors meeting a third condition, and sends the coordination request to the first base station, where the coordination request includes the identifiers of the N first reflectors.

The third condition includes N reflectors whose reflected signal quality exceeds a quality threshold or whose reflected signal quality is the best. In other words, the first UE selects, based on the signal quality reflected by each first reflector, the N first reflectors whose reflected signal quality exceeds the quality threshold or the N first reflectors whose reflected signal quality is the best.

Optionally, the signal reflected by the first reflector may be a measurement signal sent by the second base station or a downlink signal sent by the second base station to second UE, where the second UE is UE homed to the second base station. Therefore, when the reflected signal is the measurement signal, the first UE determines that a state of the first reflector is an idle state; or when the reflected signal is the downlink signal to the second UE, the first UE determines that a state of the first reflector is an in-use state.

Optionally, the first UE may preferably select a first reflector in the idle state.

Optionally, the first UE may obtain, through measurement, identifiers of a plurality of second base stations and a first reflector belonging to each second base station. Correspondingly, the coordination request may include an identifier of each second base station and an identifier of the first reflector belonging to each second base station.

Optionally, a sequence of the identifiers of the N first reflectors in the coordination request may be a sequence in which the identifiers are arranged based on the signal quality reflected by the N first reflectors.

Optionally, in the manner 2, the first UE sends the coordination request when the first UE needs to send a large amount of data to the first base station. Alternatively, the first UE sends the coordination request when receiving an instruction from the first base station.

Optionally, the first base station sends the instruction to the first UE when the first base station needs to send a large amount of data to the first UE.

Step 702: The first base station sends a coordination request to the second base station, where the coordination request includes the identifiers of the N first reflectors.

For example, referring to the network architecture shown in FIG. 1 or FIG. 2, the first base station selects the reflector 4 and the reflector 5, and sends the coordination request to the second base station, where the coordination request includes an identifier of the reflector 4 and an identifier of the reflector 5.

Optionally, referring to FIG. 2, the first base station sends the coordination request to the management device, and the management device determines, based on the identifier of each first reflector included in the coordination request, the second base station to which each first reflector belongs, and sends the coordination request to the second base station.

If the first base station obtains, in step 701, the identifiers of the plurality of second base stations and the first reflector belonging to each second base station, the first base station separately sends a coordination request to each second base station based on an identifier of the second base station. For any second base station, a coordination request sent by the first base station to the second base station includes an identifier of a first reflector belonging to the second base station.

Step 703: The second base station receives the coordination request, determines, based on the identifiers of the N first reflectors included in the coordination request, to release a control right on M first reflectors, and sends a coordination response to the first base station, where the coordination response includes identifiers of the M first reflectors, the N first reflectors include the M first reflectors, and M is an integer greater than 0 and less than or equal to N.

In this step, the second base station receives the coordination request, where the coordination request includes the identifiers of the N first reflectors; and the second base station selects the M first reflectors from the N first reflectors corresponding to the identifiers of the N first reflectors, releases the control right on the M first reflectors, and sends the coordination response to the first base station, where the coordination response includes the identifiers of the M first reflectors.

Optionally, the second base station may determine, based on an identifier of each access reflector included in a correspondence between an access reflector identifier and a UE identifier, each access reflector belonging to the second base station. The second base station removes the access reflector from the N first reflectors corresponding to the identifiers of the N first reflectors, and selects the M second reflectors from the rest of the first reflectors.

Optionally, the second base station selects M idle first reflectors from the rest of the first reflectors.

Optionally, all of the M first reflectors are idle first reflectors, or the second base station can select, from the rest of the first reflectors, not only an idle first reflector but also a first reflector being used by the second UE.

Optionally, the second base station may select some of reflection units in the second reflector from the first reflector being used by the second UE. That the second base station releases a control right on the second reflector is releasing a control right on the some of the reflection units in the second reflector.

Optionally, the coordination response includes information about the N first reflectors. Referring to Table 1 below, information about one first reflector includes an identifier of the second base station to which the first reflector belongs, an identifier of the first reflector, category information of the first reflector, and control indication information of the first reflector. The category information is used to indicate that the first reflector is an idle reflector or the first reflector is used by the second UE, or whether the first reflector is an access reflector. The control indication information is used to indicate information such as whether the second base station agrees to release a control right on the first reflector.

TABLE 1

| Identifier of the second base station | Identifier of the first reflector | Category information of the first reflector | Control indication information |
| --- | --- | --- | --- |

Optionally, the second base station may alternatively obtain M first reflectors and release a control right on the M first reflectors in a manner other than the foregoing manner of steps 701 to 703. For example, another manner is listed below. The another manner is as follows:

The first base station sends a coordination request to the second base station, where the coordination request includes location description information of the first UE. The second base station receives the coordination request, determines, based on the location description information of the first UE and from first reflectors belonging to the second base station, M second reflectors that can cover the first UE, releases a control right on the M first reflectors, and sends a coordination response to the first base station, where the coordination response includes identifiers of the M first reflectors.

Optionally, the second base station determines a location of the first UE based on the location description information of the first UE, obtains a distance between the first UE and each first reflector based on the location of the first UE and basic information of each first reflector belonging to the second base station, and selects the M first reflectors whose distances from the first UE are less than a distance threshold.

For some of the M first reflectors, the second base station allocates some of reflection units in the first reflector to the first UE. The coordination response includes unit indication information, and the unit indication information is used to indicate the some of the first reflectors and the some of the reflection units in the first reflector.

Step 704: The first base station receives the coordination response, and obtains the control right on the M first reflectors based on the identifiers of the M first reflectors included in the coordination response.

Optionally, when the coordination response includes the unit indication information, the first base station further determines the some of the first reflectors and the some of the reflection units in the first reflector that are indicated by the unit indication information.

Optionally, if the first base station obtains a plurality of second base stations and sends a coordination request to each second base station, in this step, the first base station receives coordination responses from the plurality of second base stations.

Step 705: The first base station adjusts reflection phases of the M second reflectors, where the adjusted M second reflectors are used to reflect a signal between the first base station and the first UE.

For a detailed implementation process of this step, refer to related content in step 405 in the embodiment shown in FIG. 4. Details are not described herein again.

Step 706: The first base station communicates with the first UE by using the M second reflectors.

In this step, when the first base station sends a downlink signal to the first UE, the M second reflectors reflect the downlink signal to the first UE. Alternatively, when the first UE sends an uplink signal to the first base station, the M second reflectors reflect the uplink signal to the first base station.

Optionally, when the first base station has adjusted reflection phases of Z second reflectors according to the embodiment shown in FIG. 4, the first base station communicates with the first UE by using the Z second reflectors and the M first reflectors.

Optionally, before this step is performed, transmit power of the first UE may further need to be adjusted. During implementation, the first base station measures channel quality information of an uplink equivalent channel between the first base station and the first UE. The uplink equivalent channel includes M cascaded channels. The M cascaded channels are in one-to-one correspondence with the M first reflectors. A cascaded channel corresponding to one first reflector includes a channel from the first UE to the one first reflector and a channel from the one first reflector to the first base station. The first base station determines a power adjustment parameter of the first UE based on the channel quality information of the uplink equivalent channel, and sends the power adjustment parameter to the first UE.

The first UE receives the power adjustment parameter, and adjusts the transmit power of the first UE based on the power adjustment parameter. After the adjustment, the first UE can communicate with the first base station.

Optionally, the uplink equivalent channel may further include Z cascaded channels. The Z cascaded channels are in one-to-one correspondence with the Z second reflectors. A cascaded channel corresponding to one second reflector includes a channel from the first UE to the one second reflector and a channel from the one second reflector to the first base station.

Optionally, the uplink equivalent channel further includes a direct channel from the first UE to the first base station.

Optionally, the transmit power of the first UE may be adjusted in a dynamic manner or a semi-static manner. For a detailed implementation process of the dynamic manner or the semi-static manner, refer to related content in step 406 in the embodiment shown in FIG. 4. Details are not described herein again.

Optionally, before this step is performed, a CP length of the first UE may further need to be adjusted. During implementation, the first base station measures delay information of the uplink equivalent channel between the first base station and the first UE, and sends CP length indication information to the first UE based on the delay information.

The first UE adjusts the CP length of the first UE based on the CP length indication information. After the adjustment, the first UE can communicate with the first base station.

Optionally, the delay information of the uplink equivalent channel includes delays of the M cascaded channels.

Optionally, the delay information of the uplink equivalent channel may further include delays of the Z cascaded channels.

Optionally, the delay information of the uplink equivalent channel further includes a delay of the direct channel from the first UE to the first base station.

Optionally, an operation of obtaining the CP length indication information by the first base station may be as follows: The first base station selects a longest delay from the delay information of the uplink equivalent channel, determines the CP length of the first UE based on the longest delay, obtains, from a correspondence between a standard CP length and CP length indication information, a standard CP length whose difference from the CP length is the smallest, and obtains, from the correspondence between a standard CP length and CP length indication information, the CP length indication information corresponding to the standard CP length.

Optionally, after receiving the CP length indication information, the first UE obtains, based on the CP length indication information, the corresponding standard CP length from the correspondence between a standard CP length and CP length indication information, and adjusts the CP length of the first UE based on the obtained standard CP length.

Optionally, after the first base station obtains the M first reflectors, the first base station does not need to exchange data such as signaling with the second base station before any time of data transmission between the first base station and the first UE, and the first base station directly performs data transmission with the first UE by using the M first reflectors. In this way, communication efficiency is improved, and a communication capability of the first UE is further improved.

In this embodiment of this application, in a process in which the first base station communicates with the first UE by using the Z second reflectors, a large amount of to-be-transmitted data may need to be transmitted between the first base station and the first UE. The first base station determines the M first reflectors belonging to the second base station, obtains the control right on the M first reflectors, adjusts the reflection phases of the M first reflectors, and then communicates with the first UE by using the Z second reflectors and the M first reflectors. In this way, channel bandwidth between the first base station and the first UE is increased, communication efficiency is improved, and the communication capability of the first UE is greatly improved. In addition, the first base station merely requests the first reflector in the second base station, and therefore does not need to request a resource of the second base station, so that a resource allocated by the second base station to the second UE is not affected. Furthermore, the second base station does not need to stop using a time-frequency resource occupied by the first UE, and the second base station does not need to change a transmission direction, so that a communication capability of the second UE is not affected.

Figure 8:
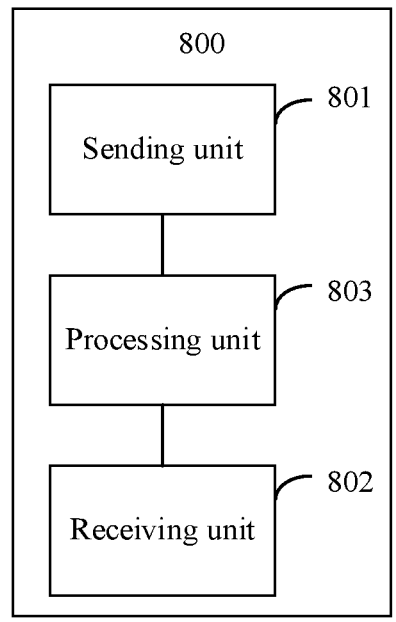
FIG. 8 is a schematic diagram of a structure of a communication apparatus according to an embodiment of this application.

Referring to FIG. 8, an embodiment of this application provides a communication apparatus 800. The apparatus 800 may be deployed in the first base station in any one of the foregoing embodiments, and includes:

a sending unit 801, configured to send a coordination request to a second base station, where the second base station is a base station other than the apparatus 800;

a receiving unit 802, configured to receive a coordination response, where the coordination response includes identifiers of M first reflectors, M is an integer greater than 0, the M first reflectors belong to the second base station, the coordination response is sent by the second base station after releasing a control right on the M first reflectors based on the coordination request, the M first reflectors can cover first user equipment UE, and the first UE is homed to the apparatus 800; and a processing unit 803, configured to obtain the control right on the M first reflectors, and communicate with the first UE by using the M first reflectors.

Optionally, for a detailed implementation process in which the processing unit 803 obtains the control right and communicates with the first UE, refer to related content in steps 704 to 706 in the embodiment shown in FIG. 7. Details are not described herein again.

Optionally, the coordination request includes identifiers of N first reflectors. The N first reflectors belong to the second base station. The coordination request is used by the second base station to determine, from the first reflectors corresponding to the identifiers of the N first reflectors, the M first reflectors for which the control right can be released.

Alternatively, the coordination request includes location description information of the first UE, and the coordination request is used by the second base station to determine, based on the location description information, the M first reflectors for which the control right can be released.

Optionally, when the coordination request includes the identifiers of the N first reflectors, the processing unit 803 is further configured to determine the N first reflectors that can cover the first UE.

Optionally, for a detailed implementation process in which the processing unit 803 determines the first reflector, refer to related content in step 701 in the embodiment shown in FIG. 7. Details are not described herein again.

Optionally, the receiving unit 802 is configured to receive the identifiers of the N first reflectors sent by the first UE, where the N first reflectors are obtained by the first UE by measuring a signal reflected by a reflector belonging to the second base station.

Optionally, the processing unit 803 is configured to:
determine, based on the location description information of the first UE, a neighboring cell that can cover the first UE; and
select, based on the location description information of the first UE, the N first reflectors from reflectors belonging to the neighboring cell.

Optionally, the processing unit 803 is further configured to:
measure channel quality information of an uplink equivalent channel between the first base station and the first UE, where the uplink equivalent channel includes M cascaded channels, each cascaded channel includes a channel from the first UE to one first reflector and a channel from the one first reflector to the first base station, and the one first reflector is one of the M first reflectors;
determine a power adjustment parameter of the first UE based on the channel quality information of the uplink equivalent channel; and
send the power adjustment parameter to the first UE, where the power adjustment parameter is used by the first UE to adjust transmit power of the first UE, and the transmit power is used by the first UE to communicate with the first base station.

Optionally, the processing unit 803 is further configured to measure delay information of the uplink equivalent channel between the first base station and the first UE, where the uplink equivalent channel includes the M cascaded channels, each cascaded channel includes a channel from the first UE to one first reflector and a channel from the one first reflector to the first base station, and the one first reflector is one of the M first reflectors.

The sending unit 801 is further configured to send cyclic prefix CP length indication information to the first UE based on the delay information, where the CP length adjustment indication information is used by the first UE to adjust a CP length of the first UE, and the CP length is used by the first UE to communicate with the first base station.

Optionally, the processing unit 803 is further configured to:
separately activate each of at least one second reflector in a timeslot corresponding to the second reflector, where the at least one second reflector belongs to the apparatus 800.

The sending unit 801 is further configured to separately send a measurement signal in a timeslot corresponding to each second reflector. The measurement signal sent in the timeslot corresponding to each second reflector is used by the first UE to select one second reflector as an access reflector for the first UE to access the first base station. In this case, after the first UE accesses the first base station, when a third base station requests a control right on the access reflector, the first base station refuses to release the control right on the access reflector. The third base station is a base station other than the first base station.

Optionally, the processing unit 803 is further configured to determine a second reflector that can cover the first UE, and communicate with the first UE by using the M first reflectors and the determined second reflector.

Optionally, for a detailed implementation process in which the processing unit 803 determines the second reflector and communicates with the first UE, refer to related content in step 404 in the embodiment shown in FIG. 4 and step 706 in the embodiment shown in FIG. 7. Details are not described herein again.

In this embodiment of this application, because the processing unit merely obtains the control right on the M first reflectors from the second base station and communicates with the first UE by using the M first reflectors, in a communication process, the first base station does not use a resource in the second base station, and the second base station does not need to stop using a time-frequency resource occupied by the first UE and does not need to change a transmission direction. Therefore, communication between the second base station and second UE homed to the second base station is not affected, so that a communication capability of the second UE is not affected. This avoids affecting a communication capability of a user in a neighboring cell. In addition, after the processing unit obtains the control right on the M first reflectors, the processing unit and the second base station do not need to exchange data such as control signaling before the processing unit communicates with the first UE, that is, the first base station and the first UE can directly communicate with each other. In this way, a communication delay is reduced, and a communication capability of the first UE is improved.

Figure 9:
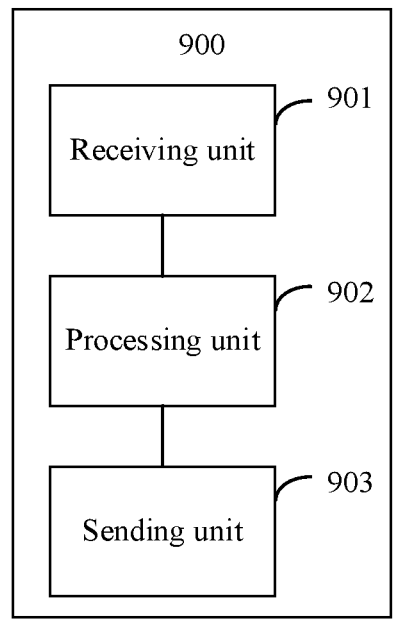
FIG. 9 is a schematic diagram of a structure of another communication apparatus according to an embodiment of this application.

Referring to FIG. 9, an embodiment of this application provides a communication apparatus 900. The apparatus 900 may be deployed in the second base station in any one of the foregoing embodiments, and includes:

- a receiving unit 901, configured to receive a coordination request sent by a first base station, where the apparatus 900 is a base station other than the first base station;
- a processing unit 902, configured to release a control right on M first reflectors based on the coordination request, where the M first reflectors can cover first user equipment UE, the first UE is homed to the first base station, the M first reflectors belong to the apparatus 900, and M is an integer greater than 0; and
- a sending unit 903, configured to send a coordination response to the first base station, where the coordination response includes identifiers of the M first reflectors, and the coordination response is used for communication between the first base station and the first UE.

Optionally, the coordination request includes identifiers of N first reflectors that can cover the first UE. The N first reflectors belong to the apparatus 900, where N is an integer greater than or equal to M.

The processing unit 902 is configured to select the M first reflectors from the first reflectors corresponding to the identifiers of the N first reflectors, and release the control right on the M first reflectors.

Optionally, for a detailed implementation process in which the processing unit 902 selects the first reflector, refer to related content in step 404 in the embodiment shown in FIG. 7 and step 703 in the embodiment shown in FIG. 7. Details are not described herein again.

Optionally, the coordination request includes location description information of the first UE.

The processing unit 902 is configured to determine, based on the location description information, the M first reflectors that can cover the first UE, and release the control right on the M first reflectors.

Optionally, for a detailed implementation process in which the processing unit 902 determines the first reflector, refer to related content in step 703 in the embodiment shown in FIG. 7. Details are not described herein again.

In this embodiment of this application, because the processing unit releases the control right on the M first reflectors, after the sending unit sends the identifiers of the M first reflectors to the first base station, the first base station merely obtains the control right on the M first reflectors from the second base station and communicates with the first UE by using the M first reflectors. In a communication process, the first base station does not use a resource in the second base station, and the second base station does not need to stop using a time-frequency resource occupied by the first UE and does not need to change a transmission direction. Therefore, communication between the second base station and second UE homed to the second base station is not affected, so that a communication capability of the second UE is not affected. This avoids affecting a communication capability of a user in a neighboring cell.

Figure 10:
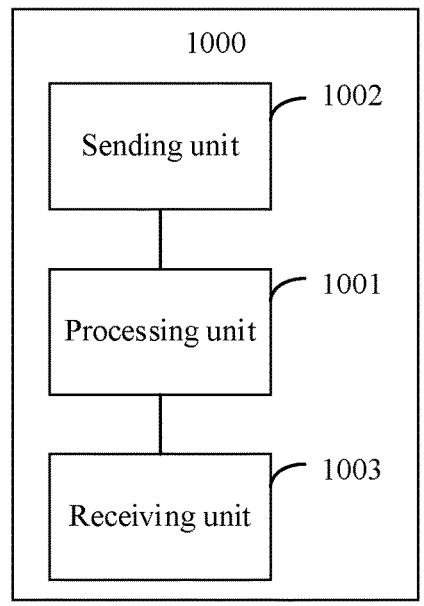
FIG. 10 is a schematic diagram of a structure of another communication apparatus according to an embodiment of this application.

Referring to FIG. 10, an embodiment of this application provides a communication apparatus 1000. The apparatus 1000 may be deployed in the first UE in any one of the foregoing embodiments, and includes:

- a processing unit 1001, configured to measure a signal reflected by N first reflectors belonging to a second base station, so as to obtain identifiers of the N first reflectors, where the second base station is a base station other than a first base station, the apparatus 1000 is homed to the first base station, and N is an integer greater than 0; and
- a sending unit 1002, configured to send the identifiers of the N first reflectors, where the identifiers of the N first reflectors are used by the first base station to obtain a control right on M first reflectors from the second base station, and the N first reflectors include the M first reflectors.

The processing unit 1001 is further configured to communicate with the first base station by using the M first reflectors.

Optionally, for a detailed implementation process in which the processing unit 1001 measures the N first reflectors, refer to related content in step 701 in the embodiment shown in FIG. 7. Details are not described herein again.

Optionally, the apparatus 1000 further includes a receiving unit 1003.

The receiving unit 1003 is configured to receive a power adjustment parameter sent by the first base station. The power adjustment parameter is determined by the first base station based on channel quality information of an uplink equivalent channel. The uplink equivalent channel includes M cascaded channels, where each cascaded channel includes a channel from the apparatus 1000 to one first reflector and a channel from the one first reflector to the first base station. The one first reflector is one of the M first reflectors.

The processing unit 1001 is further configured to adjust transmit power of the apparatus 1000 based on the power adjustment parameter, where the transmit power is used by the apparatus 1000 to communicate with the first base station.

Optionally, for a detailed implementation process in which the processing unit 803 adjusts the transmit power, refer to related content in step 706 in the embodiment shown in FIG. 7. Details are not described herein again.

Optionally, the receiving unit 1003 is configured to receive cyclic prefix CP length indication information sent by the first base station. The CP length indication information is sent by the first base station based on delay information of the uplink equivalent channel. The uplink equivalent channel includes the M cascaded channels, where each cascaded channel includes a channel from the apparatus 1000 to one first reflector and a channel from the one first reflector to the first base station. The one first reflector is one of the M first reflectors.

The processing unit 1001 is further configured to adjust a CP length of the apparatus moo based on the CP length adjustment indication information, where the CP length is used by the apparatus 1000 to communicate with the first base station.

Optionally, for a detailed implementation process in which the processing unit 803 adjusts the CP length, refer to related content in step 706 in the embodiment shown in FIG. 7. Details are not described herein again.

Optionally, the receiving unit 1003 is configured to receive, in a timeslot corresponding to each of at least one second reflector, a measurement signal sent by the first base station. The first base station is configured to separately activate each second reflector in a timeslot corresponding to the second reflector, and separately send the measurement signal in the timeslot corresponding to each second reflector. The at least one second reflector belongs to the first base station.

The processing unit 1001 is further configured to select one reflector from the at least one second reflector based on the measurement signal received in the timeslot corresponding to each second reflector, and access the first base station by using the selected reflector.

Optionally, for a detailed implementation process in which the processing unit 1001 accesses the first base station, refer to related content in steps 401 to 403 in the embodiment shown in FIG. 4. Details are not described herein again.

In this embodiment of this application, because the first base station obtains the control right on the M first reflectors from the second base station and communicates with the apparatus by using the M first reflectors, in a communication process, the first base station does not use a resource in the second base station, and the second base station does not need to stop using a time-frequency resource occupied by the apparatus and does not need to change a transmission direction. Therefore, communication between the second base station and second UE homed to the second base station is not affected, so that a communication capability of the second UE is not affected. This avoids affecting a communication capability of a user in a neighboring cell.

Figure 11:
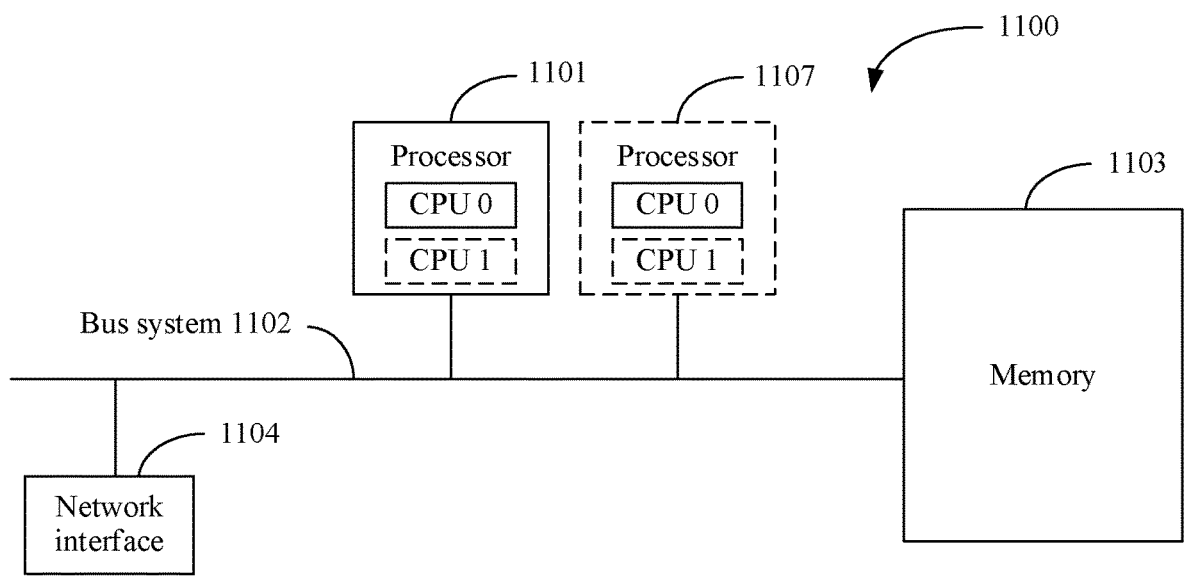
FIG. 11 is a schematic diagram of a structure of another communication apparatus according to an embodiment of this application.

Referring to FIG. 11, an embodiment of this application provides a schematic diagram of a communication apparatus 1100. The apparatus 1100 may be the first base station in any one of the foregoing embodiments. The apparatus 1100 includes at least one processor 1101, a bus system 1102, a memory 1103, and at least one network interface 1104.

The apparatus 1100 is an apparatus of a hardware structure, and may be configured to implement functional modules in the apparatus 800 shown in FIG. 8. For example, a person skilled in the art may be aware that the processing unit 803 in the apparatus 800 shown in FIG. 8 may be implemented by invoking code in the memory 1103 by the at least one processor 1101, and the sending unit 801 and the receiving unit 802 in the apparatus 800 shown in FIG. 8 may be implemented by the network interface 1104.

Optionally, the processor 1101 may be a general-purpose central processing unit (CPU), a network processor (NP), a microprocessor, an application-specific integrated circuit (ASIC), or one or more integrated circuits configured to control program execution of the solutions in this application.

The bus system 1102 may include a path for information transfer between the foregoing components.

The network interface 1104 is configured to communicate with another device or a communication network.

The memory 1103 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory 1103 is not limited thereto. The memory may exist independently, and is connected to the processor through the bus. Alternatively, the memory may be integrated with the processor.

The memory 1103 is configured to store application program code for executing the solutions in this application, and the processor 1101 controls the execution. The processor 1101 is configured to execute the application program code stored in the memory 1103, so as to implement functions in the method in this patent.

During specific implementation, in an embodiment, the processor 1101 may include one or more CPUs such as a CPU 0 and a CPU 1 in FIG. 11.

During specific implementation, in an embodiment, the apparatus 1100 may include a plurality of processors, such as the processor 1101 and a processor 1107 in FIG. 11. Each of the processors may be a single-core (single-CPU) processor or a multi-core (multi-CPU) processor. Herein, the processor may be one or more devices, circuits, and/or processing cores configured to process data (for example, computer program instructions).

Figure 12:
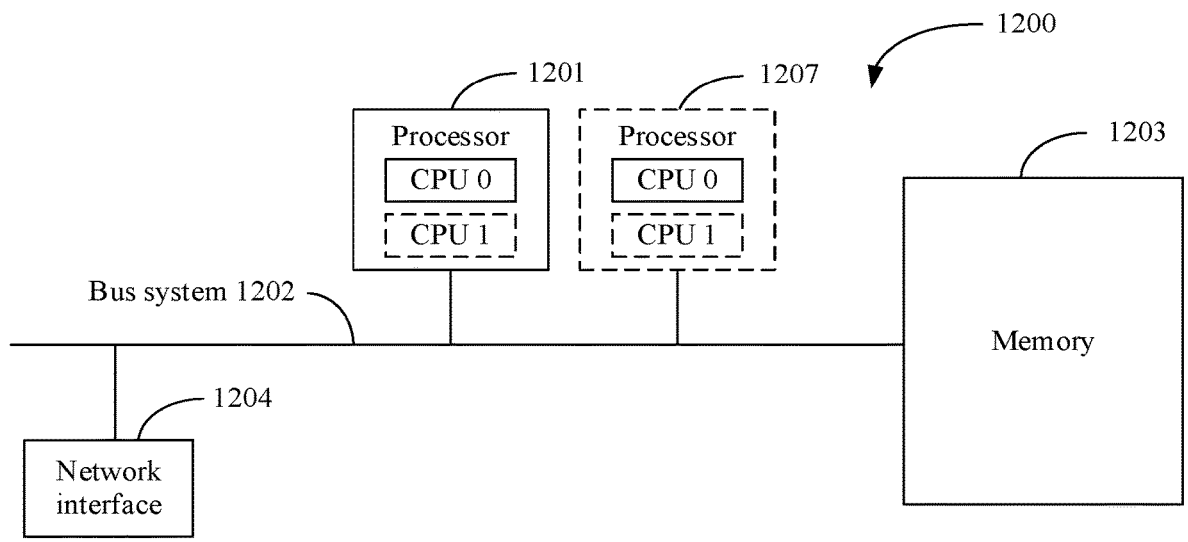
FIG. 12 is a schematic diagram of a structure of another communication apparatus according to an embodiment of this application.

Referring to FIG. 12, an embodiment of this application provides a schematic diagram of a communication apparatus 1200. The apparatus 1200 may be the second base station in any one of the foregoing embodiments. The apparatus 1200 includes at least one processor 1201, a bus system 1202, a memory 1203, and at least one network interface 1204.

The apparatus 1200 is an apparatus of a hardware structure, and may be configured to implement functional modules in the apparatus 900 shown in FIG. 9. For example, a person skilled in the art may be aware that the processing unit 902 in the apparatus 900 shown in FIG. 9 may be implemented by invoking code in the memory 1203 by the at least one processor 1201, and the receiving unit 901 and the sending unit 903 in the apparatus 900 shown in FIG. 9 may be implemented by the network interface 1204.

Optionally, the processor 1201 may be a general-purpose central processing unit (CPU), a network processor (NP), a microprocessor, an application-specific integrated circuit (ASIC), or one or more integrated circuits configured to control program execution of the solutions in this application.

The bus system 1202 may include a path for information transfer between the foregoing components.

The network interface 1204 is configured to communicate with another device or a communication network.

The memory 1203 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory 1203 is not limited thereto. The memory may exist independently, and is connected to the processor through the bus. Alternatively, the memory may be integrated with the processor.

The memory 1203 is configured to store application program code for executing the solutions in this application, and the processor 1201 controls the execution. The processor 1201 is configured to execute the application program code stored in the memory 1203, so as to implement functions in the method in this patent.

During specific implementation, in an embodiment, the processor 1201 may include one or more CPUs such as a CPU 0 and a CPU 1 in FIG. 12.

During specific implementation, in an embodiment, the apparatus 1200 may include a plurality of processors, such as the processor 1201 and a processor 1207 in FIG. 12. Each of the processors may be a single-core (single-CPU) processor or a multi-core (multi-CPU) processor. Herein, the processor may be one or more devices, circuits, and/or processing cores configured to process data (for example, computer program instructions).

Figure 13:
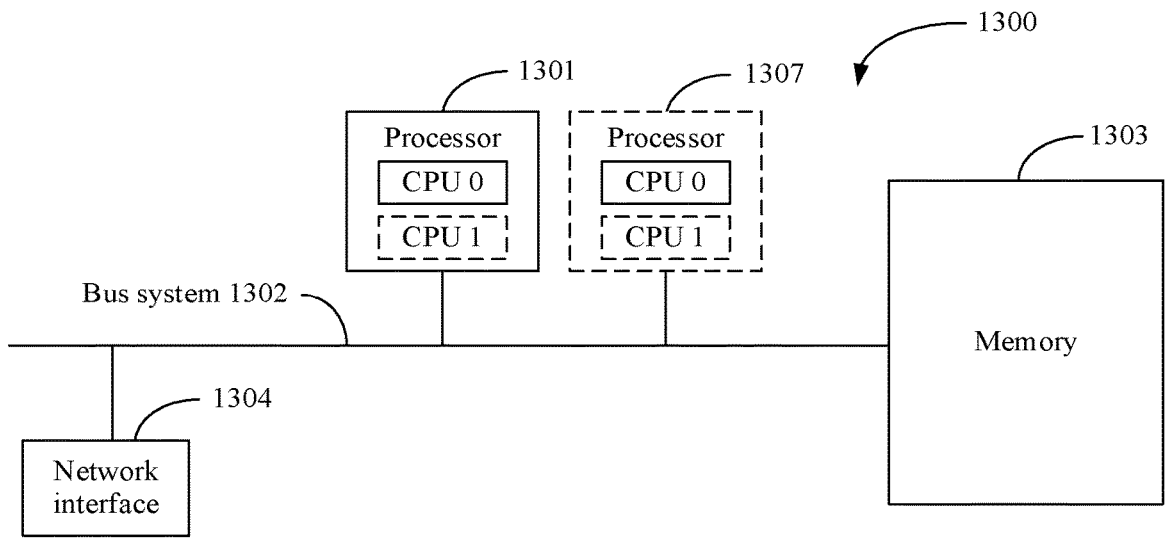
FIG. 13 is a schematic diagram of a structure of another communication apparatus according to an embodiment of this application.

Referring to FIG. 13, an embodiment of this application provides a schematic diagram of a communication apparatus 1300. The apparatus 1300 may be the first UE in any one of the foregoing embodiments. The apparatus 1300 includes at least one processor 1301, a bus system 1302, a memory 1303, and at least one network interface 1304.

The apparatus 1300 is an apparatus of a hardware structure, and may be configured to implement functional modules in the apparatus 1000 shown in FIG. 10. For example, a person skilled in the art may be aware that the processing unit 1001 in the apparatus 1000 shown in FIG. 10 may be implemented by invoking code in the memory 1303 by the at least one processor 1301, and the sending unit 1002 and the receiving unit 1003 in the apparatus 1000 shown in FIG. 10 may be implemented by the network interface 1304.

Optionally, the processor 1301 may be a general-purpose central processing unit (CPU), a network processor (NP), a microprocessor, an application-specific integrated circuit (ASIC), or one or more integrated circuits configured to control program execution of the solutions in this application.

The bus system 1302 may include a path for information transfer between the foregoing components.

The network interface 1304 is configured to communicate with another device or a communication network.

The memory 1303 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory 1303 is not limited thereto. The memory may exist independently, and is connected to the processor through the bus. Alternatively, the memory may be integrated with the processor.

The memory 1303 is configured to store application program code for executing the solutions in this application, and the processor 1301 controls the execution. The processor 1301 is configured to execute the application program code stored in the memory 1303, so as to implement functions in the method in this patent.

During specific implementation, in an embodiment, the processor 1301 may include one or more CPUs such as a CPU 0 and a CPU 1 in FIG. 13.

During specific implementation, in an embodiment, the apparatus 1300 may include a plurality of processors, such as the processor 1301 and a processor 1307 in FIG. 13. Each of the processors may be a single-core (single-CPU) processor or a multi-core (multi-CPU) processor. Herein, the processor may be one or more devices, circuits, and/or processing cores configured to process data (for example, computer program instructions).

An embodiment of this application provides a communication system, including the apparatus 800 provided in the embodiment shown in FIG. 8, the apparatus 900 provided in the embodiment shown in FIG. 9, and the apparatus 1000 provided in the embodiment shown in FIG. 10, or including the apparatus 1100 provided in the embodiment shown in FIG. 11, the apparatus 1200 provided in the embodiment shown in FIG. 12, and the apparatus 1300 provided in the embodiment shown in FIG. 13.

Figure 14:
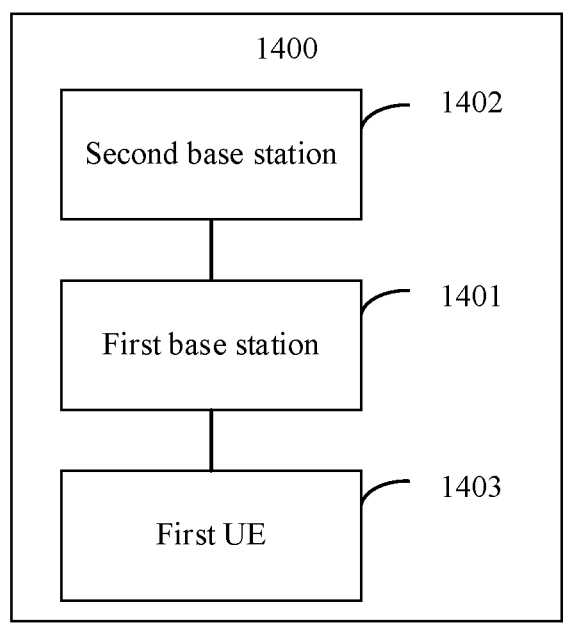
FIG. 14 is a schematic diagram of a structure of a communication system according to an embodiment of this application.

Referring to FIG. 14, the apparatus Boo provided in the embodiment shown in FIG. 8 or the apparatus 1100 provided in the embodiment shown in FIG. 11 is a first base station 1401, the apparatus 900 provided in the embodiment shown in FIG. 9 or the apparatus 1200 provided in the embodiment shown in FIG. 12 is a second base station 1402, and the apparatus 1000 provided in the embodiment shown in FIG. 10 or the apparatus 1300 provided in the embodiment shown in FIG. 13 is first UE 1403.

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, a compact disc, or the like.

The foregoing description is merely optional embodiments of this application, but is not intended to limit this application. Any modification, equivalent replacement, or improvement made without departing from the spirit and principle of this application should fall within the protection scope of this application.

What is claimed is:

1. A method, comprising:
    measuring, by a user equipment (UE), a signal reflected by N first reflectors belonging to a second base station to obtain identifiers of the N first reflectors, wherein the second base station is a base station other than a first base station, the UE is homed to the first base station, and N is an integer greater than 0;
    sending, by the UE, the identifiers of the N first reflectors, wherein the identifiers of the N first reflectors are used by the first base station to obtain a control right on M first reflectors from the second base station, and the N first reflectors comprise the M first reflectors; and
    communicating, by the UE, with the first base station by using the M first reflectors.

2. The method according to claim 1, further comprising:
    before the communicating with the first base station by using the M first reflectors:
        receiving, by the UE from the first base station, a power adjustment parameter, wherein the power adjustment parameter is determined by the first base station based on channel quality information of an uplink equivalent channel, the uplink equivalent channel comprises M cascaded channels, each cascaded channel of the M cascaded channels comprises a corresponding channel from the UE to one first reflector and a channel from the one first reflector to the first base station, and the one first reflector is one of the M first reflectors; and
        adjusting, by the UE based on the power adjustment parameter, transmit power of the UE, wherein the transmit power is used by the UE to communicate with the first base station.

3. The method according to claim 1, further comprising:
before the communicating with the first base station by using the M first reflectors:
receiving, by the UE from the first base station, cyclic prefix (CP) length indication information, wherein the CP length indication information is sent by the first base station based on delay information of an uplink equivalent channel, the uplink equivalent channel comprises M cascaded channels, each cascaded channel of the M cascaded channels comprises a corresponding channel from the UE to one first reflector and a channel from the one first reflector to the first base station, and the one first reflector is one of the M first reflectors; and
adjusting, by the UE, a CP length of the UE based on the CP length indication information, wherein the CP length is used by the UE to communicate with the first base station.

4. The method according to claim 1, further comprising:
before the UE obtains the identifiers of the N first reflectors:
receiving, by the UE from the first base station, a measurement signal in a timeslot corresponding to each second reflector of at least one second reflector, wherein the first base station separately activates each second reflector of the at least one second reflector in a corresponding timeslot corresponding to the each second reflector, and separately sends the measurement signal in the timeslot corresponding to the each second reflector, and the at least one second reflector belongs to the first base station; and
selecting, by the UE from the at least one second reflector, one reflector based on the measurement signal received in the corresponding timeslot corresponding to the each second reflector, and accessing the first base station by using the one reflector.

5. A user equipment (UE), comprising:
at least one processor; and
a non-transitory computer readable storage medium storing programming, the programming including instructions that, when executed by the at least one processor, cause the UE to perform operations including:
measuring a signal reflected by N first reflectors belonging to a second base station to obtain identifiers of the N first reflectors, wherein the second base station is a base station other than a first base station, the UE is homed to the first base station, and N is an integer greater than 0;
sending the identifiers of the N first reflectors, wherein the identifiers of the N first reflectors are used by the first base station to obtain a control right on M first reflectors from the second base station, and the N first reflectors comprise the M first reflectors; and
communicating with the first base station by using the M first reflectors.

6. The UE according to claim 5, the operations further comprising:
before the communicating with the first base station by using the M first reflectors:
receiving, from the first base station, a power adjustment parameter, wherein the power adjustment parameter is determined by the first base station based on channel quality information of an uplink equivalent channel, the uplink equivalent channel comprises M cascaded channels, each cascaded channel of the M cascaded channels comprises a corresponding channel from the UE to one first reflector and a channel from the one first reflector to the first base station, and the one first reflector is one of the M first reflectors; and
adjusting, based on the power adjustment parameter, transmit power of the UE, wherein the transmit power is used by the UE to communicate with the first base station.

7. The UE according to claim 5, the operations further comprising:
before the communicating with the first base station by using the M first reflectors:
receiving, from the first base station, cyclic prefix (CP) length indication information, wherein the CP length indication information is sent by the first base station based on delay information of an uplink equivalent channel, the uplink equivalent channel comprises M cascaded channels, each cascaded channel of the M cascaded channels comprises a corresponding channel from the UE to one first reflector and a channel from the one first reflector to the first base station, and the one first reflector is one of the M first reflectors; and
adjusting a CP length of the UE based on the CP length indication information, wherein the CP length is used by the UE to communicate with the first base station.

8. The UE according to claim 5, further comprising:
before the UE obtains the identifiers of the N first reflectors:
receiving, from the first base station, a measurement signal in a timeslot corresponding to each second reflector of at least one second reflector, wherein the first base station separately activates each second reflector of the at least one second reflector in a corresponding timeslot corresponding to the each second reflector, and separately sends the measurement signal in the timeslot corresponding to the each second reflector, and the at least one second reflector belongs to the first base station; and
selecting, from the at least one second reflector, one reflector based on the measurement signal received in the corresponding timeslot corresponding to the each second reflector, and accessing the first base station by using the one reflector.

9. A network system, comprising:
a first base station;
a second base station, wherein the second base station is a base station other than the first base station; and
a user equipment (UE),
wherein the first base station includes:
first at least one processor; and
a first non-transitory computer readable storage medium storing first programming, the first programming including first instructions that, when executed by the first at least one processor, cause the first base station to perform first operations including:
sending, to the second base station, a coordination request;
receiving a coordination response, wherein the coordination response indicates identifiers of M first reflectors, M is an integer greater than 0, the M first reflectors belong to the second base station, the coordination response is sent by the second base station after releasing a control right on the M first reflectors based on the coordination request, the M first reflectors cover the UE, and the UE is homed to the first base station;
obtaining the control right on the M first reflectors; and communicating with the UE by using the M first reflectors.

10. The network system according to claim 9, wherein the coordination request indicates identifiers of N first reflectors that cover the UE, and the N first reflectors belong to the second base station.

11. The network system according to claim 10, wherein the second base station includes:
second at least one processor; and
a second non-transitory computer readable storage medium storing second programming, the second programming including second instructions that, when executed by the second at least one processor, cause the second base station to perform second operations including:
using the coordination request to determine, from first reflectors corresponding to the identifiers of the N first reflectors, the M first reflectors for which the control right is released, and N is an integer greater than or equal to M.

12. The network system according to claim 10, wherein the coordination request comprises location description information of the UE, and wherein the second base station includes:
second at least one processor; and
a second non-transitory computer readable storage medium storing second programming, the second programming including second instructions that, when executed by the second at least one processor, cause the second base station to perform second operations including:
using the coordination request to determine, based on the location description information, the M first reflectors for which the control right is released.

13. The network system according to claim 12, wherein the coordination request indicates the identifiers of the N first reflectors, and the first operations further comprise:
determining the N first reflectors that cover the UE.

14. The network system according to claim 13, wherein the determining the N first reflectors that cover the UE comprises:
determining, based on the location description information of the UE, a neighboring cell that covers the UE; and
selecting, based on the location description information of the UE, the N first reflectors from reflectors belonging to the neighboring cell.

15. The network system according to claim 14, wherein the determining the N first reflectors that cover the UE comprises:
receiving the identifiers of the N first reflectors sent by the UE, wherein the N first reflectors are obtained by the UE by measuring a signal reflected by a reflector belonging to the second base station.

16. The network system according to claim 9, the first operations further comprising:
after the obtaining the control right on the M first reflectors:
measuring channel quality information of an uplink equivalent channel between the first base station and the UE, wherein the uplink equivalent channel comprises M cascaded channels, each cascaded channel comprises a channel from the UE to one first reflector and a channel from the one first reflector to the first base station, and the one first reflector is one of the M first reflectors;
determining a power adjustment parameter of the UE based on the channel quality information of the uplink equivalent channel; and
sending the power adjustment parameter to the UE.

17. The network system according to claim 16, wherein the UE includes:
third at least one processor; and
a third non-transitory computer readable storage medium storing third programming, the third programming including third instructions that, when executed by the third at least one processor, cause the UE to perform third operations including:
receiving, from the first base station, the power adjustment parameter;
adjusting transmit power of the UE; and
communicating with the first base station using the transmit power.

18. The network system according to claim 16, the first operations further comprising:
measuring delay information of the uplink equivalent channel between the first base station and the UE, wherein the uplink equivalent channel comprises the M cascaded channels, each cascaded channel comprises a channel from the UE to the one first reflector and a channel from the one first reflector to the first base station, and the one first reflector is one of the M first reflectors; and
sending cyclic prefix (CP) length indication information to the UE based on the delay information, wherein the CP length indication information is used by the UE to adjust a CP length of the UE, and the CP length is used by the UE to communicate with the first base station.

19. The network system according to claim 9, the first operations further comprising:
separately activating each second reflector of at least one second reflector in a corresponding timeslot corresponding to the each second reflector;
separately sending a measurement signal in the corresponding timeslot corresponding to the each second reflector, wherein the at least one second reflector belongs to the first base station, and the measurement signal sent in the corresponding timeslot corresponding to the each second reflector is used by the UE to select one second reflector as an access reflector for the UE to access the first base station; and
after the UE accesses the first base station and when a third base station requests a control right on the access reflector, refusing, by the first base station, to release the control right on the access reflector, wherein the third base station is different than the first base station.

20. The network system according to claim 19, the first operations further comprising:
determining a second reflector that covers the UE, and wherein the communicating with the UE by using the M first reflectors comprises:
communicating with the UE by using the M first reflectors and the second reflector.

* * * * *